US012763417B2

(12) United States Patent
Sueyoshi et al.

(10) Patent No.: US 12,763,417 B2
(45) Date of Patent: Oct. 13, 2026

(54) BATTERY STORAGE APPARATUS WITH RESTRICTING PORTION

(71) Applicant: HONDA MOTOR CO., LTD., Tokyo (JP)

(72) Inventors: Fumika Sueyoshi, Wako (JP); Takuya Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 699 days.

(21) Appl. No.: 18/245,036

(22) PCT Filed: Sep. 17, 2020

(86) PCT No.: PCT/JP2020/035325
§ 371 (c)(1),
(2) Date: Mar. 13, 2023

(87) PCT Pub. No.: WO2022/059147
PCT Pub. Date: Mar. 24, 2022

(65) Prior Publication Data
US 2023/0369706 A1 Nov. 16, 2023

(51) Int. Cl.
*H01M 2/10* (2006.01)
*H01M 10/42* (2006.01)
(Continued)

(52) U.S. Cl.
CPC ....... *H01M 50/264* (2021.01); *H01M 10/425* (2013.01); *H01M 50/244* (2021.01); *H01M 50/256* (2021.01); *H01M 2010/4271* (2013.01)

(58) Field of Classification Search
CPC .. H01M 50/264; H01M 50/262; H01M 50/26; H01M 50/258; H01M 50/244;
(Continued)

(56) References Cited

U.S. PATENT DOCUMENTS 10,916,742 B2 * 2/2021 Sakai .................... H02J 7/0042
2019/0393627 A1 12/2019 Etsunagi et al.
(Continued)

FOREIGN PATENT DOCUMENTS

EP 3 767 701 A1 1/2021
JP 2018-163757 A 10/2018
(Continued)

OTHER PUBLICATIONS

Japanese Office Action dated Feb. 20, 2024, Application No. 2022-550274; English machine translation included, 6 pages.
(Continued)

*Primary Examiner* — Raymond Alejandro
(74) *Attorney, Agent, or Firm* — Rankin, Hill & Clark LLP

(57) ABSTRACT

A battery storage apparatus includes: a storage portion that includes an opening through which a battery is insertable, a storage space detachably storing the battery inserted through the opening; a storage portion terminal positionally fixed relative to the storage portion and connectable to a battery terminal through contact; a portable portion supporting the battery and movable with respect to the storage portion between a connection position where the storage portion terminal and the battery terminal are connected and a disconnection position where the storage portion terminal and the battery terminal are disconnected; and a restricting portion that releasably restricts movement of the portable portion from the disconnection position toward the connection position.

8 Claims, 15 Drawing Sheets

(51) Int. Cl.
*H01M 50/244* (2021.01)
*H01M 50/256* (2021.01)
*H01M 50/264* (2021.01)

(58) Field of Classification Search
CPC ............. H01M 50/256; H01M 10/425; H01M 10/4207; H01M 2010/4271
See application file for complete search history.

(56) References Cited

U.S. PATENT DOCUMENTS

| | | | |
|---|---|---|---|
| 2020/0274119 | A1 | 8/2020 | Okubo et al. |
| 2020/0283085 | A1 | 9/2020 | Okubo et al. |
| 2021/0066678 | A1 | 3/2021 | Okubo et al. |

FOREIGN PATENT DOCUMENTS

| | | | |
|---|---|---|---|
| JP | 2020-142771 | A | 9/2020 |
| WO | 2019/064563 | A1 | 4/2019 |
| WO | 2019/064593 | A1 | 4/2019 |
| WO | 2019/064596 | A1 | 4/2019 |
| WO | 2019/064605 | A1 | 4/2019 |
| WO | 2019/064606 | A1 | 4/2019 |
| WO | 2019/176242 | A1 | 9/2019 |

OTHER PUBLICATIONS

International Search Report, International Application No. PCT/J)P2020/035325, Date of mailing: Dec. 1, 2020, 3 pages.

* cited by examiner

BATTERY STORAGE APPARATUS WITH RESTRICTING PORTION

TECHNICAL FIELD

The present invention relates to a battery housing device (battery storage apparatus) capable of storing a battery having a battery terminal.

BACKGROUND ART

For example, a battery storage apparatus for storing a battery having a battery terminal is installed in an electric vehicle that uses the power of a battery, a charging device that charges the battery (for example, WO 2019/176242 A1), or the like. A battery storage apparatus includes a storing portion in which the battery is stored in an attachable and detachable manner, and a storing portion terminal that is in contact with a battery terminal inside the storing portion to enable transmission of electric power and signals. Specifically, the storing portion is cased-shaped with an open top end, and the battery can be inserted and removed through the opening. The storing portion terminal is provided at an inner bottom portion of the storing portion. The battery terminal is provided at the bottom portion of the battery.

The battery is inserted into the storing portion through the opening with the positions of the battery terminal and the storing portion terminal corresponding to each other, whereby the storing portion terminal and the battery terminal are connected to each other. That is, the operation of storing the battery into the storing portion and the operation of connecting the storing portion terminal and the battery terminal to each other are performed in a series.

On the other hand, the battery is pulled out from the storing portion through the opening, whereby the storing portion terminal and the battery terminal are disconnected and the battery is removed from the storing portion. That is, the operation of removing the battery from the storing portion and the operation of disconnecting the storing portion terminal and the battery terminal are carried out in a series.

SUMMARY OF THE INVENTION

In the case of this type of battery storage apparatus, it is desired to protect the battery terminal and the storing portion terminal by suppressing as much as possible the impact applied to the battery terminal and the storing portion terminal due to collisions with each other or the like. However, the impact applied to the battery terminal and the storing portion terminal tends to increase in the case of the battery storage apparatus where the operation of attaching and detaching the storing portion terminal and the battery terminal follows the operation of inserting and removing the battery into and from the storing portion as described above. Therefore, there is concern that it becomes difficult to protect the battery terminal and the storing portion terminal, especially when the weight of the battery is large.

The present invention has been devised in order to solve this type of problem, and has the object of providing a battery storage apparatus that can well protect the battery terminal and the storing portion terminal.

A battery storage apparatus configured to store a battery including a battery terminal is provided with a storage portion that includes an opening through which the battery can be inserted and removed and a storage space that stores the battery in a manner so that the battery is attached and detached through the opening; a storage portion terminal that is positionally fixed relative to the storage portion and is configured to connect with the battery terminal through contact; a portable portion that is configured to support the battery and to move with respect to the storage portion between a connection position where the storage portion terminal and the battery terminal are connected and a disconnection position where the storage portion terminal and the battery terminal are disconnected; and a restricting portion that restricts, in a releasable manner, movement of the portable portion from the disconnection position toward the connection position.

In the case of this battery storage apparatus, when the battery is stored in the storage space, the movement of the portable portion supporting the battery is restricted by the restricting portion, whereby the battery can be stopped at the disconnection position before reaching the connection position. Thereafter, by releasing the restriction imposed by the restricting portion, the battery can be moved from the disconnection position to the connection position to connect the battery terminal and the storage portion terminal. That is, it is possible to perform, in stages, the operation of inserting the battery into the housing portion up to the disconnection position and the operation of inserting the battery from the disconnection position to the connection position to connect the battery terminal and the storage portion terminal.

Further, when removing the battery stored in the storage portion, the battery supported by the portable portion is moved from the connection position to the disconnection position to release the connection between the battery terminal and the storage portion terminal. In this way, the battery moved from the connection position to the disconnection position is restricted from moving toward the connection position (backward movement) by the restricting portion. Therefore, it is possible to perform, in stages, the operation of disconnecting the battery terminal and the storage portion terminal to move the battery up to the disconnection position and the operation of further moving the battery at the disconnection position to take the battery out of the storage portion.

As described above, according to the battery storage apparatus, it is not necessary to perform in a series the operation of inserting and removing the battery into and from the storage portion and the operation of attaching and detaching the storage portion terminal and the battery terminal. Therefore, it is possible to easily suppress an impact due to a collision or the like applied to the battery terminal and the storage portion terminal and to protect well the battery terminal and the storage portion terminal.

DETAILED DESCRIPTION OF THE INVENTION

Figure 1:
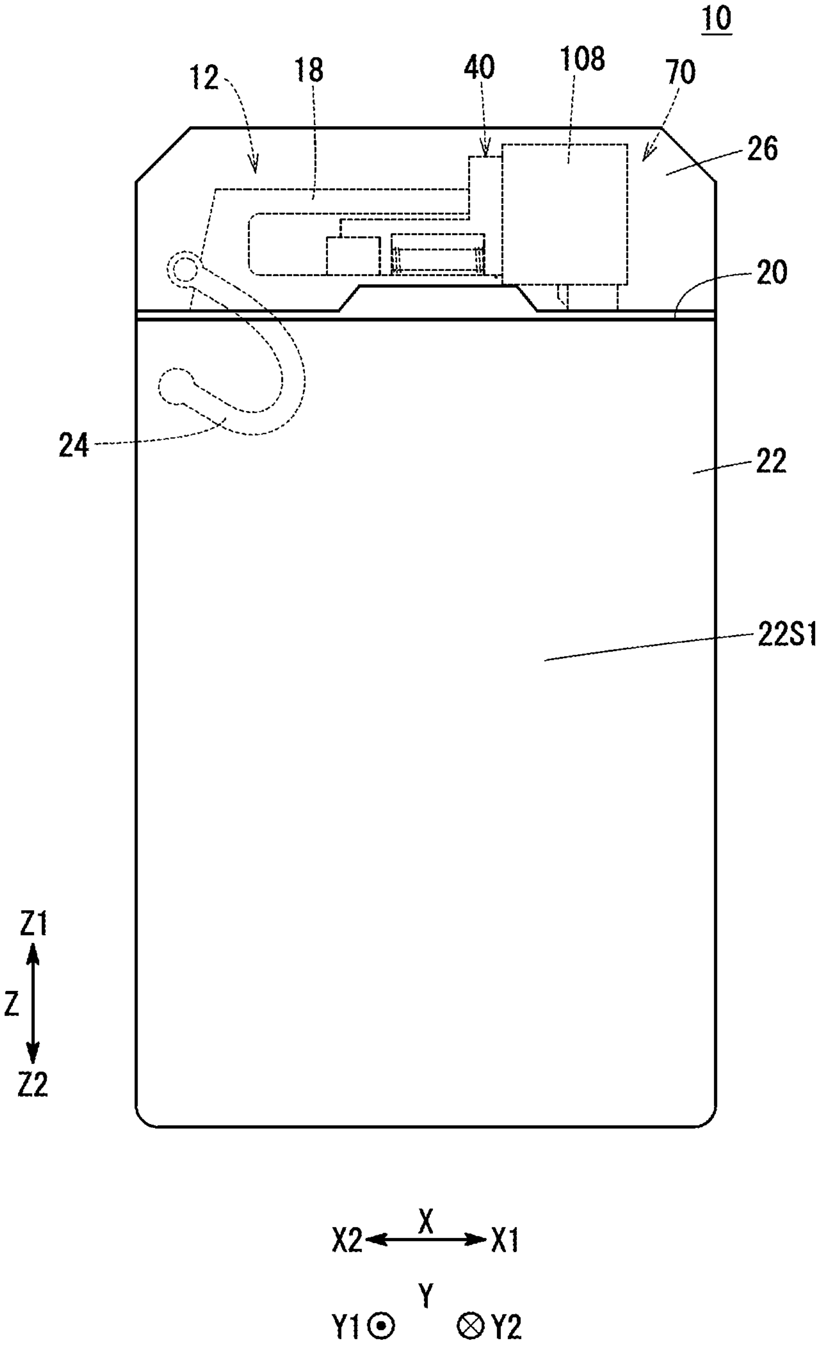
FIG. 1 is an external configurational diagram of a battery storage apparatus according to the present embodiment, in a case where a portable portion body is at a connection position (holding position) and an opening and closing portion is a the closed state.

Preferred embodiments of a battery storage apparatus according to the present invention will be described in detail with reference to the accompanying drawings. In the drawings below, constituent elements having the same or similar functions and effects are denoted by the same reference numerals, and repeated description may be omitted.

A battery storage apparatus 10 according to the present embodiment of FIG. 1 can be used by being incorporated in various configurations in which a battery 12 is attached and detached, such as an electric vehicle or electric equipment (neither shown in the drawings) that utilizes the electric power of the battery 12, a charging device (not shown in the drawings) that charges the battery 12, or the like.

Figure 4:
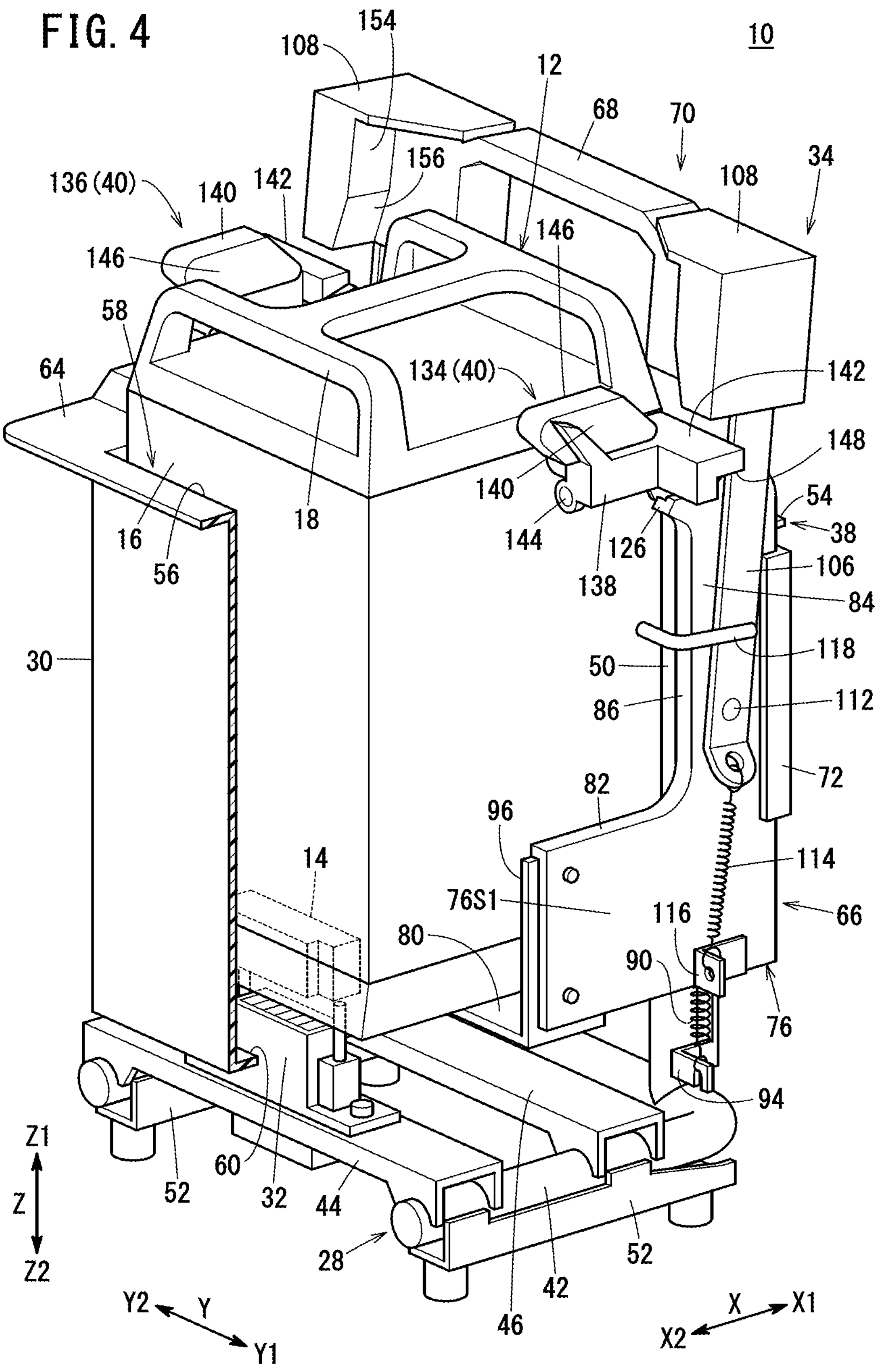
FIG. 4 is a descriptive diagram of the battery storage apparatus when the portable portion body of FIG. 3 supports the battery at the disconnection position (insertion and removal position)

The battery storage apparatus 10 stores a battery 12, which has a battery terminal 14 (FIG. 4), in an attachable and detachable manner. Although the details of the battery 12 are not particularly limited, in the present embodiment, as shown in FIG. 4, it is assumed that the battery 12 is a secondary battery in which a plurality of battery cells and a battery management device (not shown) are housed inside a substantially rectangular parallelepiped battery case 16 serving as an exterior of the battery 12.

A battery grip portion 18 that can be gripped by a worker is provided on an end portion on one end side of the battery 12 in the longitudinal direction thereof. The battery terminal 14 is provided on the end portion on the other end side of the battery 12 in the longitudinal direction. In the present embodiment, the battery 12 is stored in the battery storage apparatus 10 in a state where the battery terminal 14 side is oriented downward. Therefore, the up-down direction of the battery 12 is described with the orientation occurring when the battery storage apparatus 10 is stored as a reference.

Although not shown in detail in the drawings, the bottom portion of the battery terminal 14 is exposed from the battery case 16 through a notch or the like provided in the bottom wall of the battery case 16, for example. Furthermore, the top portion of the battery terminal 14 is connected to input/output terminals of the plurality of fuel cells by a power line through a battery management apparatus, and connected to the battery management apparatus by a signal transmission line, for example.

The battery storage apparatus 10 will be described in detail while referencing FIGS. 1 to 15B. In the present embodiment, as shown in FIGS. 1 and 2, the battery storage apparatus 10 has an exterior formed by a shell case 22, which is a substantially rectangular parallelepiped case provided with a case opening 20 in the top surface, and an opening and closing portion 26 that is capable of moving via a hinge 24 in a direction to open and close the case opening 20.

In the following description of the battery storage apparatus 10, the arrow X1 side in FIGS. 1 to 15B is the back surface side, the arrow X2 side is the front surface side, the arrow Y1 side is the first side surface side, and the arrow Y2 side is the second side surface side. However, the orientation of the battery storage apparatus 10 when installed in the electric vehicle, electric equipment, charging device, or the like described above is not particularly limited.

Figure 2:
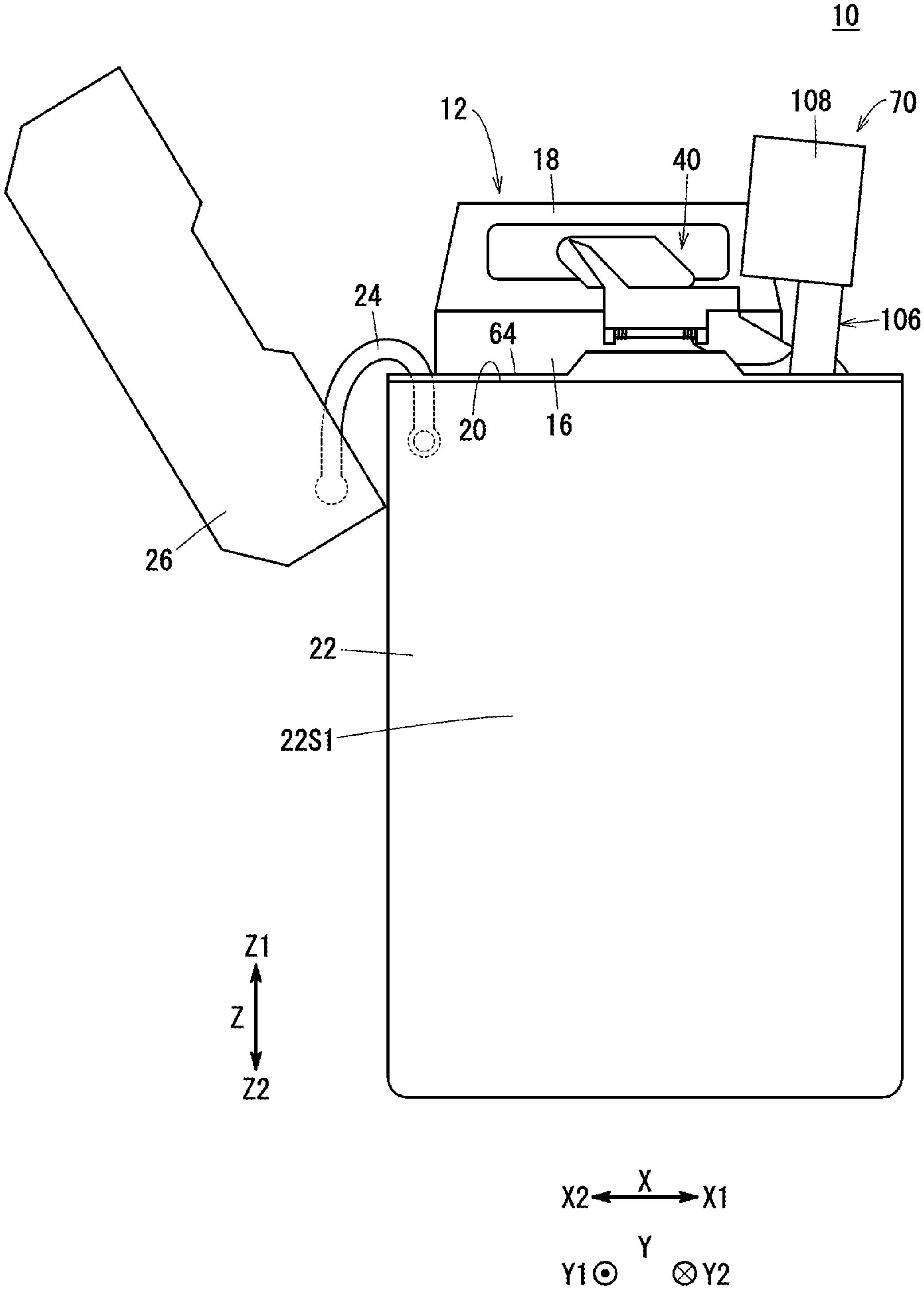
FIG. 2 is a descriptive diagram of a case in which the portable portion body of the battery storage apparatus of FIG. 1 is at the disconnection position (insertion and removal position) and the opening and closing portion is in an open state.
Figure 3:
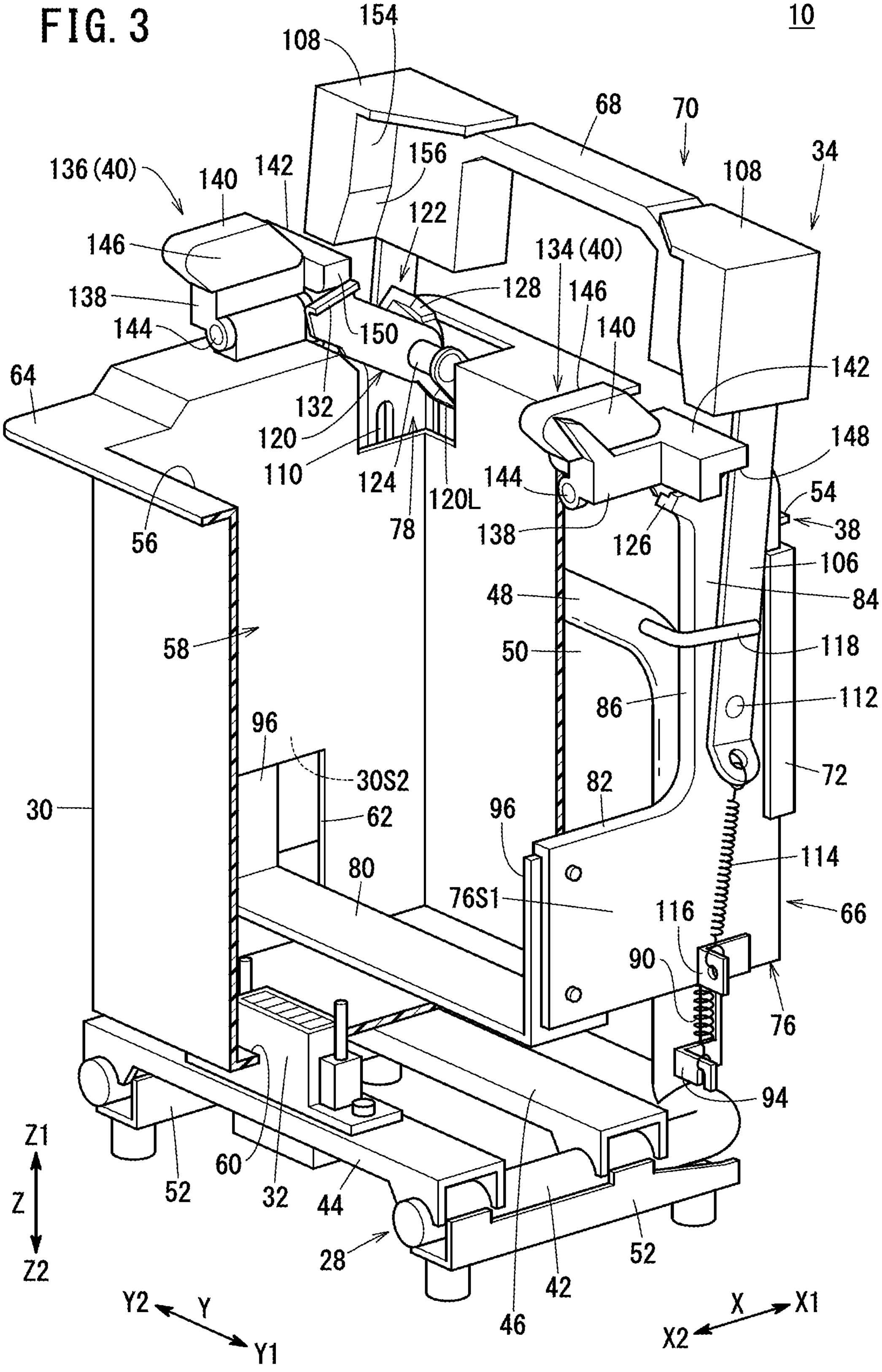
FIG. 3 is a schematic perspective diagram of essential parts for describing the configuration inside the opening and closing portion and the shell case of the battery storage apparatus.

As shown in FIG. 3, a frame 28, a storage portion 30, a storage portion terminal 32, a portable portion 34, a damping portion 36 (see FIG. 9), a restricting portion 38, and a lock portion 40 are provided inside the shell case 22 of FIGS. 1 and 2. The frame 28 is fixed to the inside of the shell case 22 (FIG. 1), and reinforces the battery storage apparatus 10. Specifically, the frame 28 includes a bottom pipe frame 42, a first bridging portion 44, a second bridging portion 46, a back pipe frame 48, and a back plate 50 (see FIG. 9).

The bottom pipe frame 42, when viewed in the up-down direction (arrow Z direction), is substantially U-shaped with the back surface side (arrow X1 side) being curved, and is fixed to the bottom wall of the shell case 22 (FIG. 1) via an attaching member 52. The first bridging portion 44 and the second bridging portion 46 each span over between portions of the bottom pipe frame 42 in the arrow Y direction. The first bridging portion 44 is arranged at a front-surface-side (arrow X2 side) end portion of the bottom pipe frame 42. The second bridging portion 46 is arranged farther toward the back surface side than the first bridging portion 44. The storage portion terminal 32 is fixed to the first bridging portion 44. Due to this, the storage portion terminal 32 protrudes upward from the first bridging portion 44.

Figure 9:
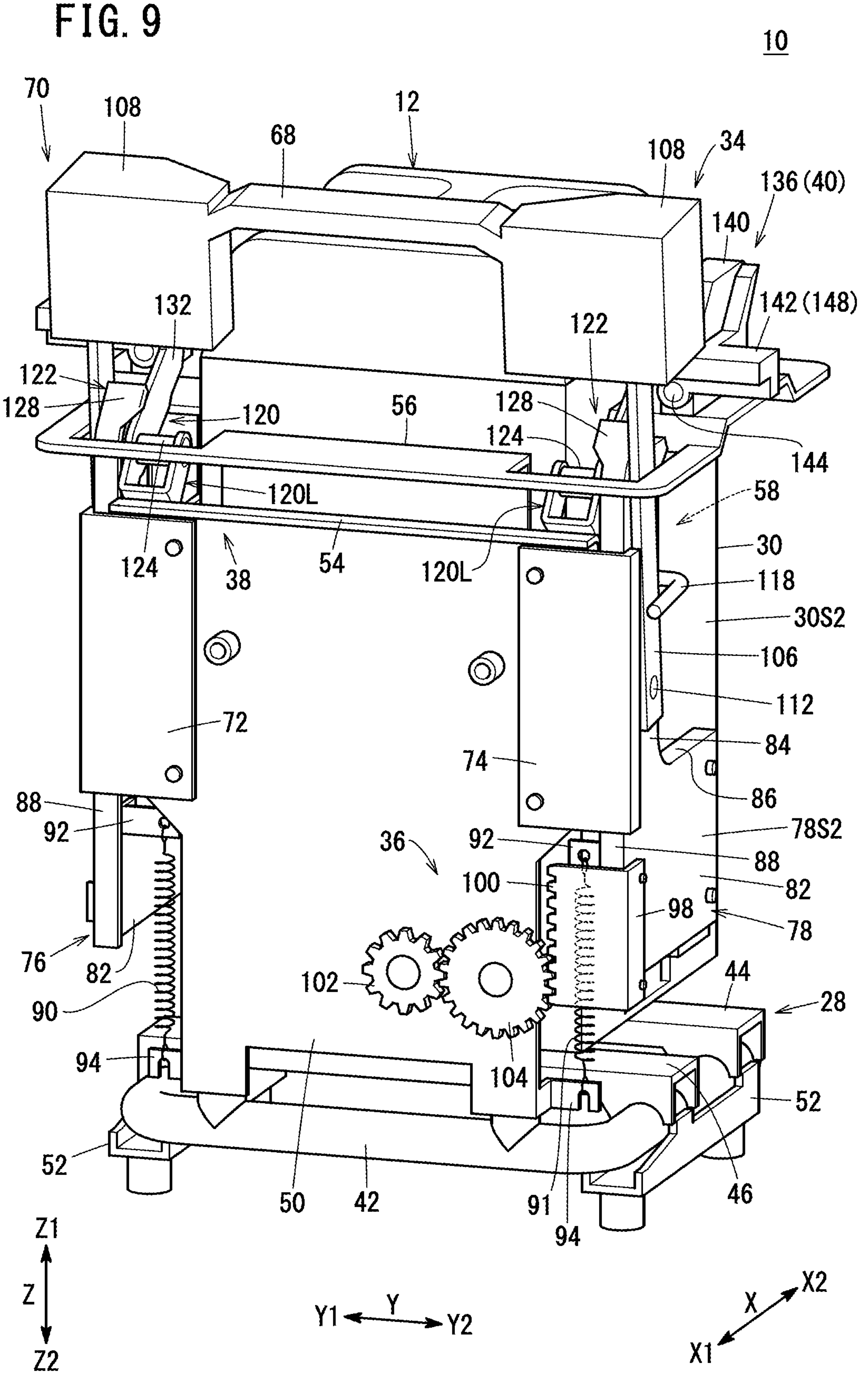
FIG. 9 is a perspective diagram of a back surface side of the battery storage apparatus of FIG. 4.
Figure 10:
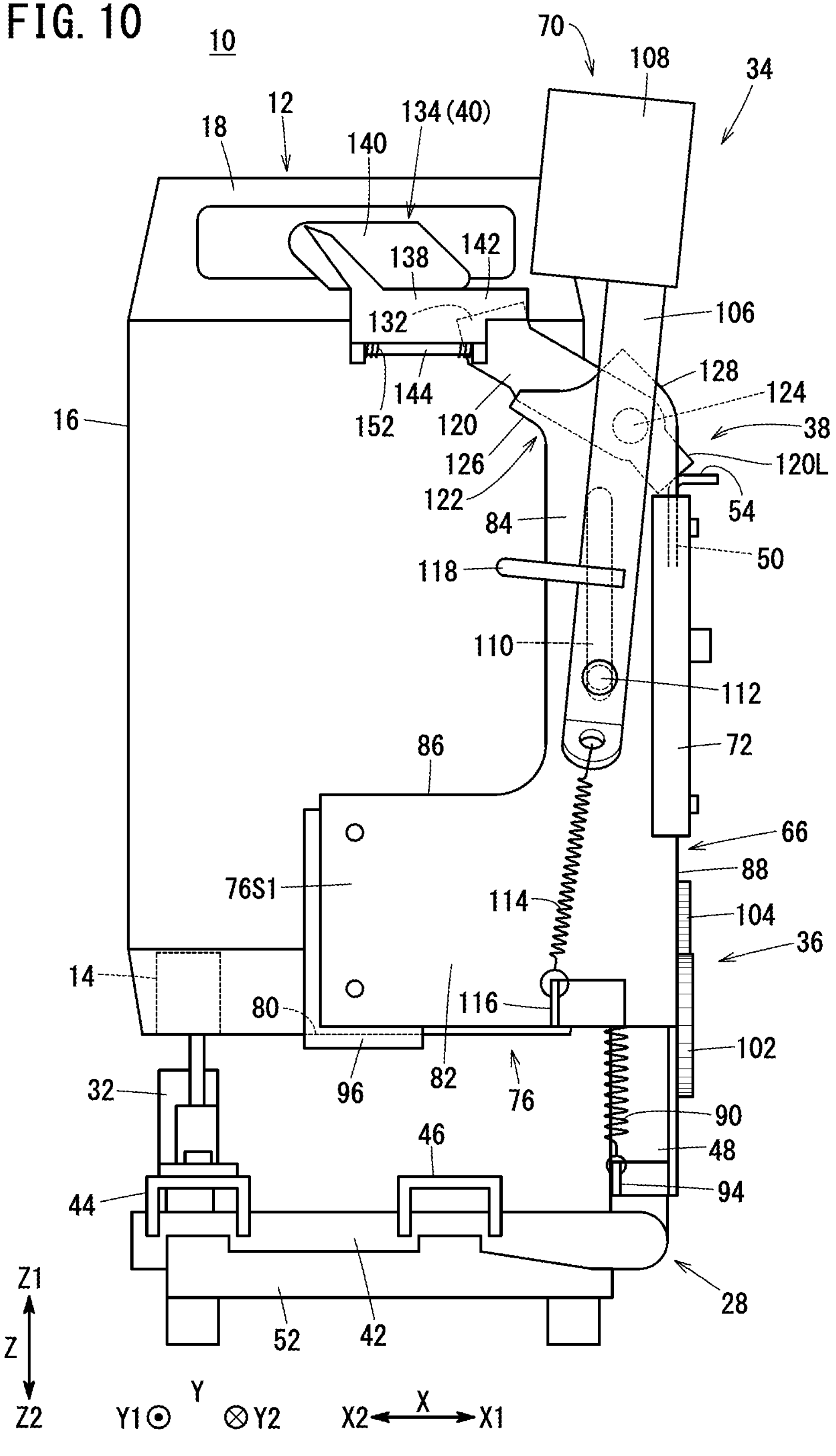
FIG. 10 is a descriptive diagram of the battery storage apparatus in a case where the battery terminal and the storage portion terminal are in the disconnected state, the engagement portion and the engaged portion are in the engagement state, the lock portion is in the unlocked state, and the operating portion is arranged and oriented according to the elastic bias of the operating portion biasing member.

The back pipe frame 48 is fixed to the back-surface-side (arrow X1 side) end portion of the bottom pipe frame 42, and stands upward from this end portion. Furthermore, the back pipe frame 48 is substantially U-shaped with a curved top portion, when viewed in the arrow X direction. The back plate 50 (FIG. 9) opposes the back surface of the shell case 22 (FIG. 1), by being attached to the end portion of the back pipe frame 48 on the arrow X1 side. Furthermore, the back plate 50 (FIG. 9) is fixed to the back surface of the shell case 22 (FIG. 1) by a screw or the like. As shown in FIGS. 9 and 10, an engaged portion 54 protruding toward the arrow X1 side is provided on the top end portion of the back plate 50.

In FIGS. 3 to 8, the first side surface side (arrow Y1 side) of the storage portion 30 is omitted from the drawings, but the storage portion 30 is a substantially rectangular parallelepiped case with an open top end. Specifically, the storage portion 30 includes an opening 56 through which the battery 12 can be inserted and removed and a storage space 58 in which the battery 12 is stored, being attachable and detachable through the opening 56. In FIGS. 10 to 15B, the entirety of the storage portion 30 is not shown.

In the present embodiment, the insertion and removal direction of the battery 12 when inserted into or removed from the storage space 58 via the opening 56 is the up-down direction, but the insertion and removal direction may be inclined relative to the up-down direction. The battery 12 is inserted into the storage space 58 from the upward side toward the downward side. Furthermore, the battery 12 inside the storage space 58 is pulled out from the downward side toward the upward side.

The external dimensions of the storage portion 30 are slightly smaller than the external dimensions of the shell case 22 (FIG. 1). Therefore, the outer wall surface of the storage portion 30 stored in the shell case 22 faces the inner wall surface of the shell case 22, with a prescribed interval therebetween.

As shown in FIG. 3, the storage portion 30 is fixed to the frame 28. Specifically, the bottom surface of the storage portion 30 is placed on the first bridging portion 44 and the second bridging portion 46, and the back surface of the storage portion 30 is fixed to the front surface side (arrow X2 side) of the back pipe frame 48 by a screw or the like. A terminal hole 60 through which the storage portion terminal 32 protruding from the first bridging portion 44 is inserted is provided in the bottom wall of the storage portion 30. The top portion of the storage portion terminal 32 is arranged in the storage space 58 of the storage portion 30, through this terminal hole 60. In other words, the storage portion terminal 32 is positionally fixed relative to the storage portion 30.

Figure 7:
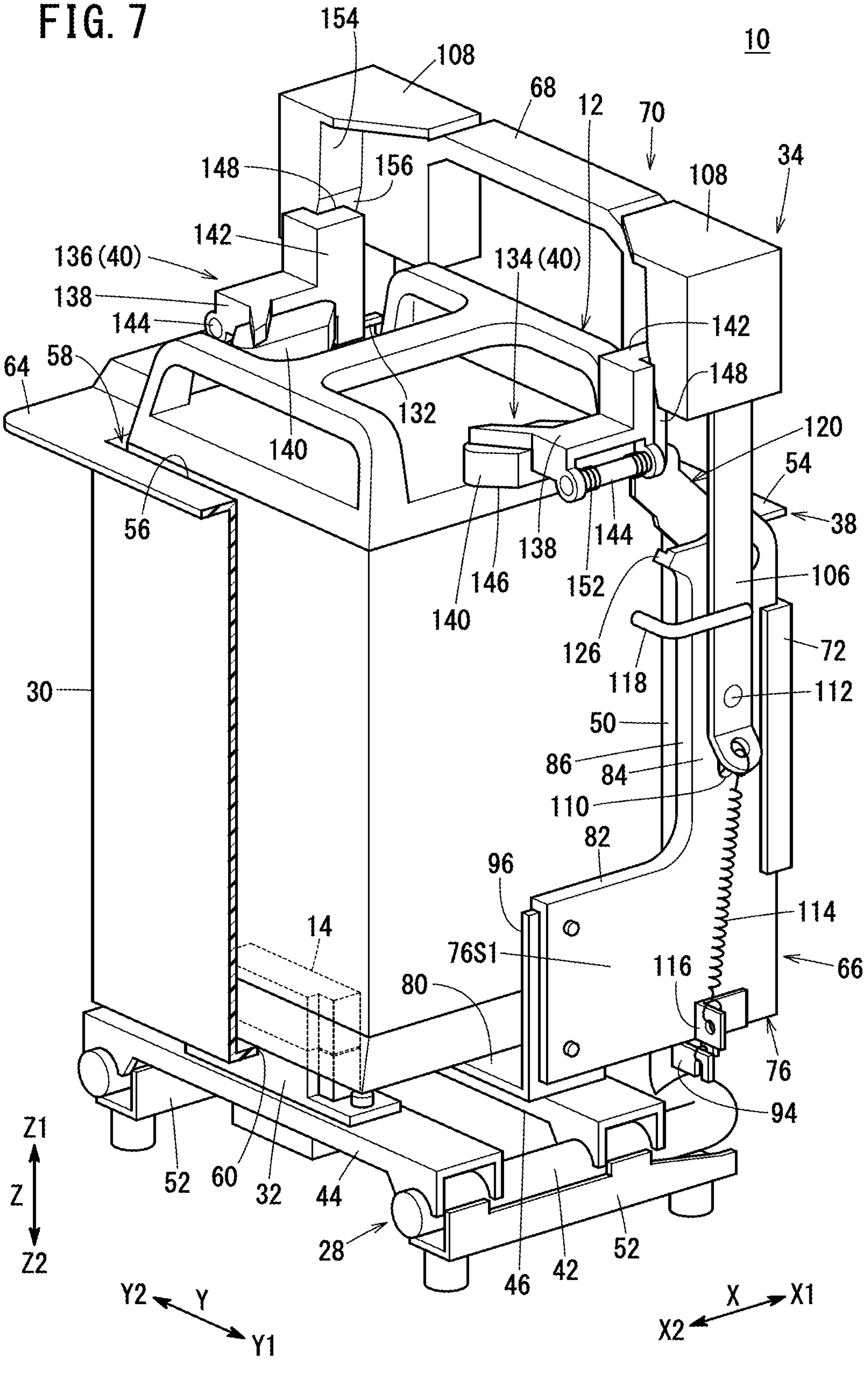
FIG. 7 is a descriptive diagram of the battery storage apparatus when the portable portion body of FIG. 6 is moved to the connection position (holding position), the battery terminal and storage portion terminal are connected through contact, and the lock portion is in the locked state.

As shown in FIG. 7, in the storage space 58, the bottom portion of the battery terminal 14 contacts the top portion of the storage portion terminal 32, thereby electrically connecting the storage portion terminal 32 and the battery terminal 14. Although not shown in any of the drawings, the bottom portion of the storage portion terminal 32 is electrically connected to a control section and drive motor of the electric vehicle or the like in which the battery storage apparatus 10 is installed, via a power line, signal transmission line, or the like.

As shown in FIG. 3, an insertion hole 62 extending in the up-down direction is provided in the bottom end side of each side wall forming the first side surface (not shown in the drawings) and the second side surface 30S2 of the storage portion 30. The lock portion 40 is attached to the top end side of each side wall forming the first side surface (not shown in the drawings) and the second side surface 30S2 of the storage portion 30.

A protruding edge portion 64, which protrudes outward from the opening 56, is provided at an external circumferential edge portion of the opening 56 of the storage portion 30. By arranging the protruding edge portion 64 over the top end of the shell case 22 (FIG. 1), the gap between the opening 56 of the storage portion 30 of FIG. 3 and the case opening 20 of the shell case 22 of FIGS. 1 and 2 is closed off, when viewed in the insertion and removal direction. In other words, the direction in which the opening and closing portion 26 described above opens and closes the case opening 20 is the direction in which the opening 56 of the storage portion 30 is opened and closed.

As shown in FIG. 4, the portable portion 34 is capable of supporting the battery 12. Furthermore, in a state where the battery 12 is being supported, the portable portion 34 is capable of moving relative to the storage portion 30 between a connection position (holding position) shown in FIGS. 7 and 13 and a disconnection position (insertion and removal position) shown in FIGS. 4 and 10.

Figure 13:
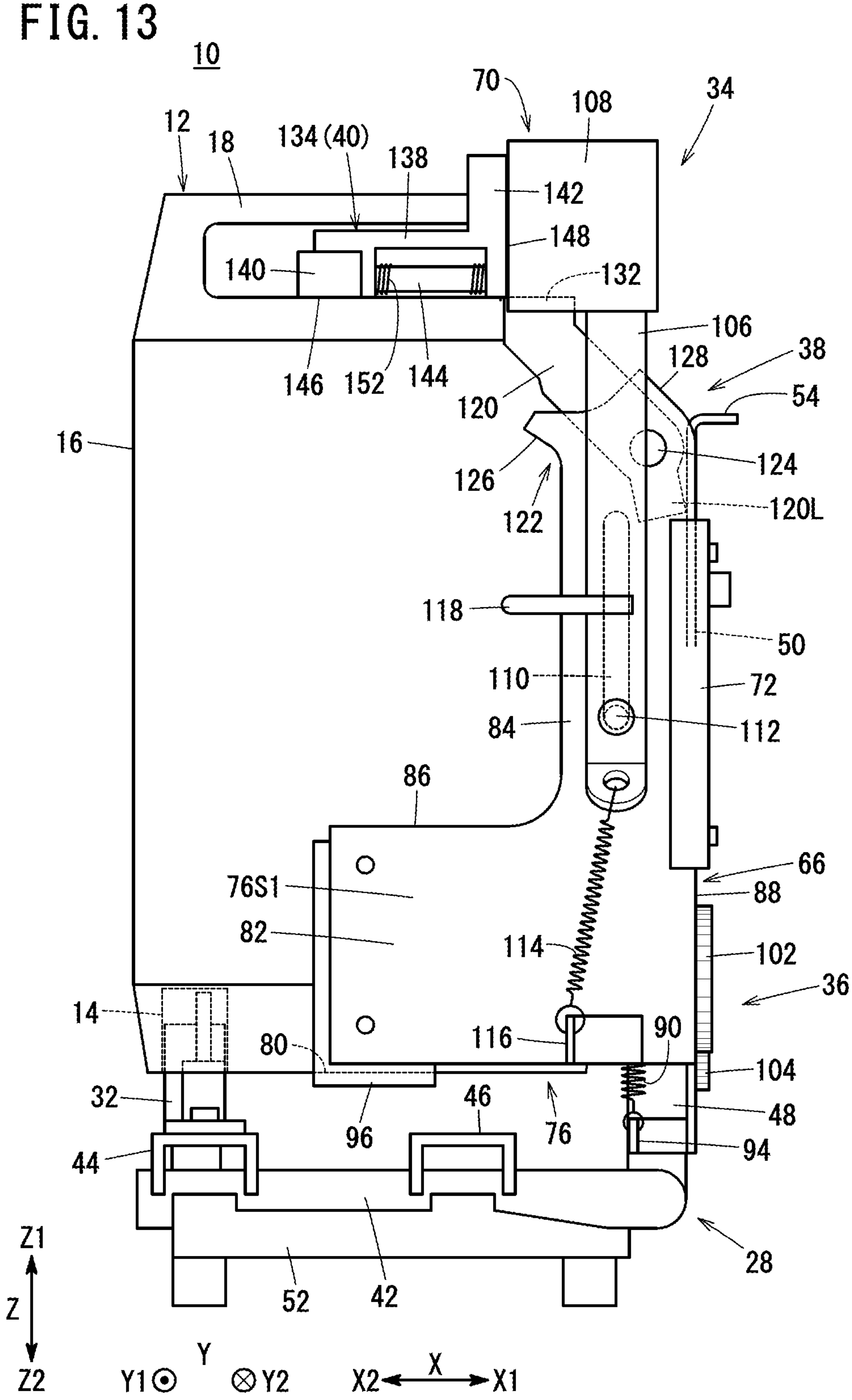
FIG. 13 is a descriptive diagram of the battery storage apparatus in a case where the battery terminal and the storage portion terminal are in the connected state through contact, the engagement portion and the engaged portion are in the disengagement state, the lock portion is in the locked state, and the lock fixing portion of the operating portion is engaged with the lock portion.

As shown in FIGS. 7 and 13, at the connection position (holding position), the battery terminal 14 of the battery 12 supported by the portable portion 34 contacts the storage portion terminal 32, to realize an electric connection. Furthermore, the battery storage apparatus 10 is capable of holding the battery 12 supported by the portable portion 34, immovably at the connection position (holding position) in the storage space 58, as described further below.

As shown in FIGS. 4 and 10, at the disconnection position (insertion and removal position), the battery terminal 14 of the battery 12 supported by the portable portion 34 is distanced from the storage portion terminal 32, such that there is no electric connection. The disconnection position is arranged farther upward than in the connection position and preferably set such that the battery terminal 14 of the battery 12 supported by the portable portion 34 is close to or adjacent to the storage portion terminal 32. Furthermore, in the disconnection position (insertion position), the battery 12 is inserted into and removed from the portable portion 34.

Specifically, the portable portion 34 includes a portable portion body 66 that supports the battery 12 and an operating portion 70 that is provided with a grip portion 68 capable of being gripped by a worker. The portable portion body 66 at the disconnection position (insertion and removal position) reaches the connection position (holding position) by moving downward (arrow Z2 side) in the insertion and removal direction. The portable portion body 66 at the connection position (holding position) reaches the disconnection position (insertion and removal position) by moving upward (arrow Z1 side) in the insertion and removal direction. The movement of the portable portion body 66 in the insertion and removal direction is guided by a first portable portion guide 72 and a second portable portion guide 74, which are fixed to the back plate 50 of FIG. 9.

The portable portion body 66 is configured to include a first body portion 76 (FIGS. 3 and 10), a second body portion 78 (FIG. 9), and a bottom plate portion 80 (FIG. 3).

The first body portion 76 is installed between the first side surface 22S1 (FIG. 1) of the shell case 22 and the first side surface (not shown in the drawings) of the storage portion 30. The second body portion 78 is installed between the second side surface (not shown in the drawings) of the shell case 22 (FIG. 1) and the second side surface 30S2 (FIG. 3) of the storage portion 30. As shown in FIG. 3, the bottom plate portion 80 extends in the arrow Y direction between the bottom end portions of the first body portion 76 and second body portion 78, to transverse the storage space 58 by being inserted into the insertion hole 62 of the storage portion 30. Due to the insertion hole 62 extending in the up-down direction as described above, the bottom plate portion 80 inside the insertion hole 62 is capable of moving relative to the storage portion 30 in the up-down direction (insertion and removal direction).

The first body portion 76 and the second body portion 78 each include a base portion 82 that extends in the arrow X direction and a guide forming portion 84 that extends upward from the back surface side (arrow X1 side) of the base portion 82. That is, the first body portion 76 and the second body portion 78 are each substantially L-shaped with the up-down-direction length of the back surface side being greater than that of the front surface side, when viewed in the arrow Y direction. A front-surface-side rib 86 protruding toward the storage portion 30 side is provided integrally on the top end of the base portion 82 and the front-surface-side end portion of the guide forming portion 84. Furthermore, a back-surface-side rib 88 (FIG. 9) protruding toward the storage portion 30 side is provided integrally on the back-surface-side end portions of the base portion 82 and the guide forming portion 84.

When the first body portion 76 moves in the insertion and removal direction, the corner portion formed by the back-surface-side rib 88 of the first body portion 76 and the first side surface 76S1 of the first body portion 76 follows the first portable portion guide 72. Due to this, the movement of the first body portion 76 in the insertion and removal direction is guided. Furthermore, when the second body portion 78 moves in the insertion and removal direction, the corner portion formed by back-surface-side rib 88 of the second body portion 78 and the second side surface 78S2 (FIG. 9) of the second body portion 78 follows the second portable portion guide 74. Due to this, the movement of the second body portion 78 in the insertion and removal direction is guided.

As shown in FIG. 9, the first body portion 76 is elastically biased toward the bottom side (arrow Z2 side) in the up-down direction by a first body biasing member 90 formed by a tension coil spring, for example. The top end portion of the first body biasing member 90 is attached to the back surface side of the first body portion 76 via an attachment portion 92. The bottom end portion of the first body biasing member 90 is attached to the bottom end side of the back plate 50 via an attachment portion 94.

Similarly, the second body portion 78 is elastically biased toward the bottom side (arrow Z2 side) in the up-down direction by a second body biasing member 91 formed by a tension coil spring, for example. The top end portion of the second body biasing member 91 is attached to the back surface side of the second body portion 78 via an attachment portion 92. The bottom end portion of the second body biasing member 91 is attached to the bottom end side of the back plate 50 via the attachment portion 94.

As shown in FIG. 3, the bottom plate portion 80 has upright portions 96 that extend upward, provided at respective end sides in the arrow Y direction. The upright portion

96 on the arrow Y1 side of the bottom plate portion 80 is fixed to the base portion 82 of the first body portion 76 on the outer side of the storage portion 30. The upright portion 96 on the arrow Y2 side of the bottom plate portion 80 is fixed to the base portion 82 of the second body portion 78 on the outer side of the storage portion 30. In this way, the first body portion 76 and the second body portion 78 are formed integrally via the bottom plate portion 80. Therefore, the first body portion 76, the second body portion 78, and the bottom plate portion 80 are capable of moving integrally relative to the storage portion 30.

As shown in FIG. 4, the battery 12 inserted into the storage space 58 via the opening 56 of the storage portion 30 is placed on the bottom plate portion 80 of the portable portion body 66 at the disconnection position (insertion and removal position). Due to this, the battery 12 is supported by the portable portion body 66. At this time, by adjusting the position of the battery terminal 14 relative to the storage portion terminal 32, the battery terminal 14 is arranged above the storage portion terminal 32 facing the storage portion terminal 32 in a disconnected state. As shown in FIG. 7, the storage portion terminal 32 and the battery terminal 14 contact each other to be electrically connected when the battery 12 has moved along with the portable portion body 66 to the connection position (holding position).

On the other hand, when removing the battery 12 from the portable portion body 66, the battery 12 is pulled to the upward side in the insertion and removal direction from the bottom plate portion 80 of the portable portion body 66, at the disconnection position (insertion and removal position), shown in FIG. 4. Due to this, the battery 12 is removed from the portable portion body 66, and the battery 12 is also removed from the storage space 58 through the opening 56. That is, the insertion and removal of the battery 12 to and from the portable portion body 66 is performed in a state where the portable portion body 66 is at the disconnection position (insertion and removal position).

As shown in FIG. 9, a rack forming portion 98 that extends to the back surface side of the second body portion 78 is fixed to the second side surface 78S2 of the second body portion 78. A rack 100 is formed on the arrow-Y1-side end portion of the rack forming portion 98. The rack 100, together with a rotary damper 102 and an idle gear 104, forms the damping portion 36. The rotary damper 102 and the idle gear 104 are each rotatably fixed to the back surface side of the back plate 50.

The rotary damper 102 is a unidirectional damper mechanism that produces a braking force during rotation that is counterclockwise in FIG. 9. In other words, the torque needed to rotate the rotary damper 102 counterclockwise is higher than the torque needed to rotate the rotary damper 102 clockwise. The idle gear 104 is capable of rotating the rotary damper 102 in conjunction with the movement of the rack 100 in the insertion and removal direction, by interlocking with both the rack 100 and the rotary damper 102.

When the rack forming portion 98 moves from the disconnection position toward the connection position together with the portable portion body 66, the idle gear 104 interlocked with the rack 100 rotates clockwise. Due to this, the rotary damper 102 rotates counterclockwise and produces a braking force. That is, the damping portion 36 attenuates the movement speed of the portable portion body 66 when the portable portion body 66 moves from the disconnection position toward the connection position. On the other hand, when the rack forming portion 98 moves from the connection position toward the disconnection position together with the portable portion body 66, the idle gear 104 rotates in the counterclockwise direction and the rotary damper 102 rotates in the clockwise direction. Therefore, the damping portion 36 does not attenuate or barely attenuates the movement speed of the portable portion body 66 when the portable portion body 66 moves from the connection position toward the disconnection position.

The movement of the portable portion body 66 between the connection position (holding position) and the disconnection position (insertion and removal position) can be achieved by, for example, having the worker grip the grip portion 68 and move the operating portion 70 in the insertion and removal direction relative to the storage portion 30. The up-to-down movement of the portable portion body 66 from the disconnection position (insertion and removal position) toward the connection position (holding position) may be realized by the weight of the battery 12 itself or the elastic biasing force of the first body biasing member 90 and the second body biasing member 91. The movement speed of the portable portion body 66 at this time is attenuated by the damping portion 36 as described above.

The operating portion 70 includes, in addition to the grip portion 68, an operating portion body 106 and a lock fixing portion 108. The grip portion 68 is arranged at the top end of the operating portion 70 (side opposite the storage portion terminal 32 side in the insertion and removal direction), and extends in the arrow Y direction. Lock fixing portions 108 are arranged respectively at the extension-direction ends of the grip portion 68, and an operating portion body 106 is provided extending downward from each lock fixing portion 108.

As shown in FIG. 10, the operating portion body 106 is movably attached to the guide forming portion 84 of the portable portion body 66. Due to this, the operating portion 70 is capable of moving relative to the portable portion body 66. A guide portion 110, which extends in the insertion and removal direction and guides the movement of the operating portion 70 relative to the portable portion body 66, is provided on the guide forming portion 84.

In the present embodiment, the guide portion 110 is a long hole extending in the insertion and removal direction. The operating portion body 106 is fixed to a fastener 112 that is movably inserted into the guide portion 110 and prevented from coming off. Therefore, the operating portion 70 is capable of moving relative to the portable portion body 66, according to the movable range of the fastener 112 inside the guide portion 110.

Specifically, by moving the fastener 112 along the extension direction inside the guide portion 110, the operating portion 70 can move in the insertion and removal direction (up-down direction) relative to the portable portion body 66. Furthermore, by rotating the fastener 112 inside the guide portion 110 with the arrow Y direction as the axial direction, the operating portion 70 can also be relatively moved in a direction (disengagement direction, which will be described further below) in which the operating portion body 106 is inclined relative to the extension direction of the guide portion 110, when viewed in the arrow Y direction.

Furthermore, as an example, when the operating portion 70 is moved upward relative to the guide forming portion 84, the fastener 112 abuts against the top end of the guide portion 110. When the operating portion 70 is pulled upward farther in this state, the portable portion body 66 can be moved upward, along with the operating portion 70, relative to the storage portion 30. In the present embodiment, the grip portion 68 and the lock fixing portion 108 are arranged farther upward than the opening 56 of the storage portion 30 regardless of the relative position of the operating portion 70 with respect to the portable portion body 66 and the storage portion 30, but the grip portion 68 and lock fixing portion 108 are not particularly limited to this arrangement. The details of the lock fixing portion 108 are described further below.

As shown in FIG. 10, the top end portion of an operating portion biasing member 114, which is formed by a tension coil spring or the like, for example, is attached to the bottom end of the operating portion body 106, which is attached to the first body portion 76. The bottom end portion of the operating portion biasing member 114 is attached to an operating portion biasing member attachment portion 116 provided on the first side surface 76S1 of the first body portion 76. The operating portion biasing member attachment portion 116 is arranged farther downward than the bottom end of the guide portion 110, and farther on the front surface side (arrow-X2-direction side) than the guide portion 110.

By arranging the operating portion biasing member 114 in this way, the operating portion 70 is such that the operating portion body 106 is inclined relative to the extension direction of the guide portion 110 (insertion and removal direction, up-down direction), when viewed in the arrow Y direction, and the grip portion 68 is elastically biased toward the outer side of the storage space 58 (arrow X1 side). Furthermore, due to the operating portion biasing member 114, the operating portion 70 is such that the fastener 112 of the operating portion body 106 is elastically biased toward the bottom end of the guide portion 110.

In the present embodiment, the operating portion biasing member 114 is provided only between the first body portion 76 and the operating portion body 106 attached to the first body portion 76. However, an operating portion biasing member 114 may be provided in a similar manner to the second body portion 78 (FIG. 9) instead of the first body portion 76, or to both the first body portion 76 and the second body portion 78.

A disengagement portion 118 is fixed to the operating portion body 106, farther upward than a connection portion connecting to the fastener 112, by welding or the like, for example. The disengagement portion 118 extends from the operating portion body 106 toward the arrow X2 side, and is shaped such that the end portion thereof on the arrow X2 side bends toward the storage portion 30 side. The disengagement portion 118 extends toward the arrow-X2-direction side beyond the guide forming portion 84 of the portable portion body 66, when viewed in the arrow Y direction. Furthermore, the disengagement portion 118 opposes the front-surface-side rib 86 of the guide forming portion 84 and extends to a position where it is not in contact with the storage portion 30, when viewed in the arrow X direction.

As shown in FIGS. 9 and 10, the restricting portion 38 restricts, in a releasable manner, the movement of the portable portion body 66 from the disconnection position (insertion and removal position) toward the connection position (holding position). In the present embodiment, the restricting portion 38 includes an engagement portion 120 and a rotational range limiting portion 122 provided to the portable portion body 66, and the engaged portion 54 that is positionally fixed relative to the storage portion terminal 32.

Figure 12:
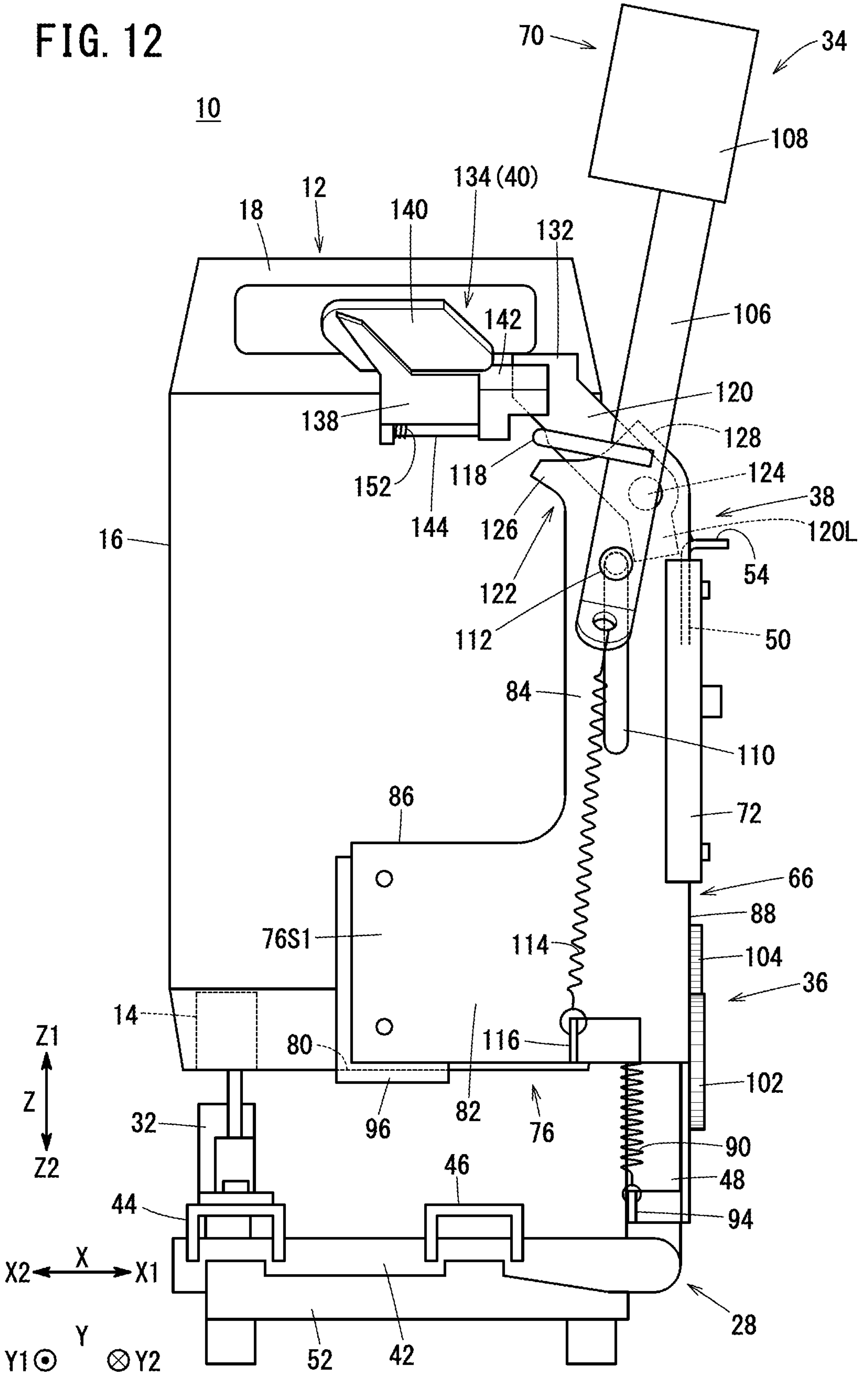
FIG. 12 is a descriptive diagram of the battery storage apparatus in a case where the battery terminal and the storage portion terminal are in the disconnected state, the engagement portion and the engaged portion are in the disengagement state, the lock portion is in the unlocked state, and the operating portion has been moved in the dissolution direction.

As shown in FIG. 10, when the portable portion body 66 is at the disconnection position (insertion and removal position), the engagement portion 120 is engaged with the engaged portion 54. Due to this, the movement of the portable portion body 66 from the disconnection position (insertion and removal position) toward the connection position (holding position) is restricted. On the other hand, as shown in FIG. 12, when the engagement between the engagement portion 120 and the engaged portion 54 is dissolved, the restriction on the movement of the portable portion body 66 described above is removed, and therefore the portable portion body 66 can move from the disconnection position (insertion and removal position) toward the connection position (holding position).

Specifically, the engagement portion 120 is attached to the top end of the back surface side of the guide forming portion 84, and is capable of rotating centered on an engagement portion rotational shaft 124 extending in the arrow Y direction. By rotating centered on the engagement portion rotational shaft 124, the engagement portion 120 switches between an engagement state (FIG. 10) of being engaged with the engaged portion 54 provided on the top end of the back plate 50 and a disengagement state (FIG. 12) in which the engagement with the engaged portion 54 is dissolved. In the following, the rotational orientation of the engagement portion 120 when in the engagement state is referred to as the engagement orientation, and the rotational orientation of the engagement portion 120 when in the disengagement state is referred to as the disengagement orientation.

Figure 14B:
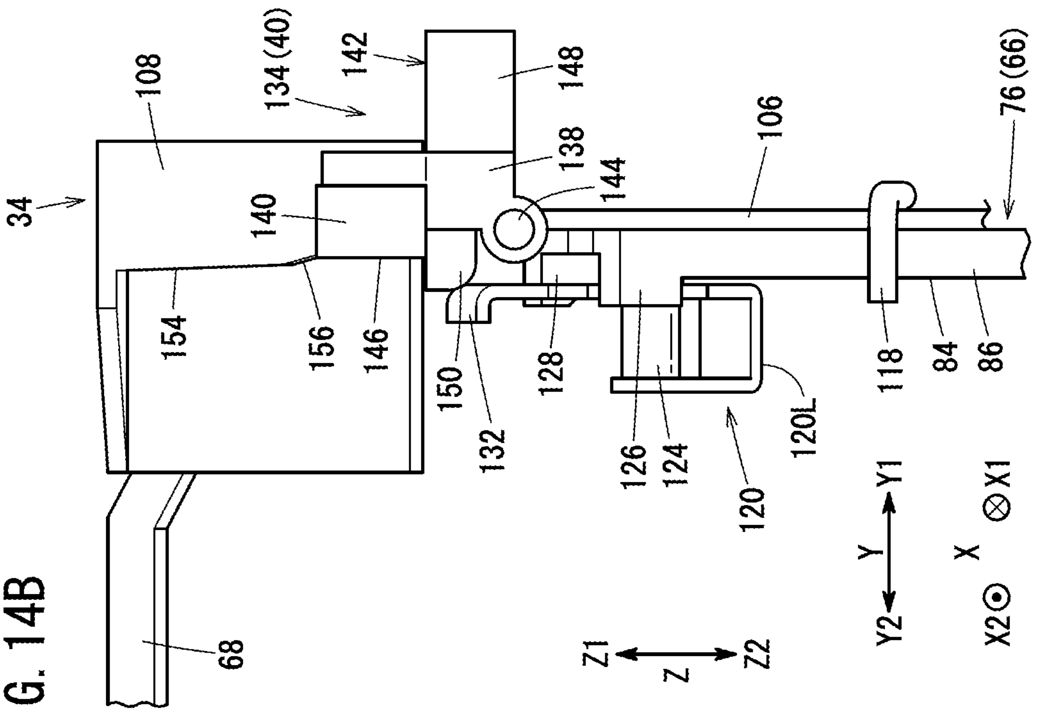
FIG. 14A is a descriptive diagram of an enlarged perspective view of essential parts describing the lock portion and lock switching portion in the unlocked state and the lock fixing portion not engaged with the lock portion and FIG. 14B is a front view of FIG. 14A.
Figure 14A:
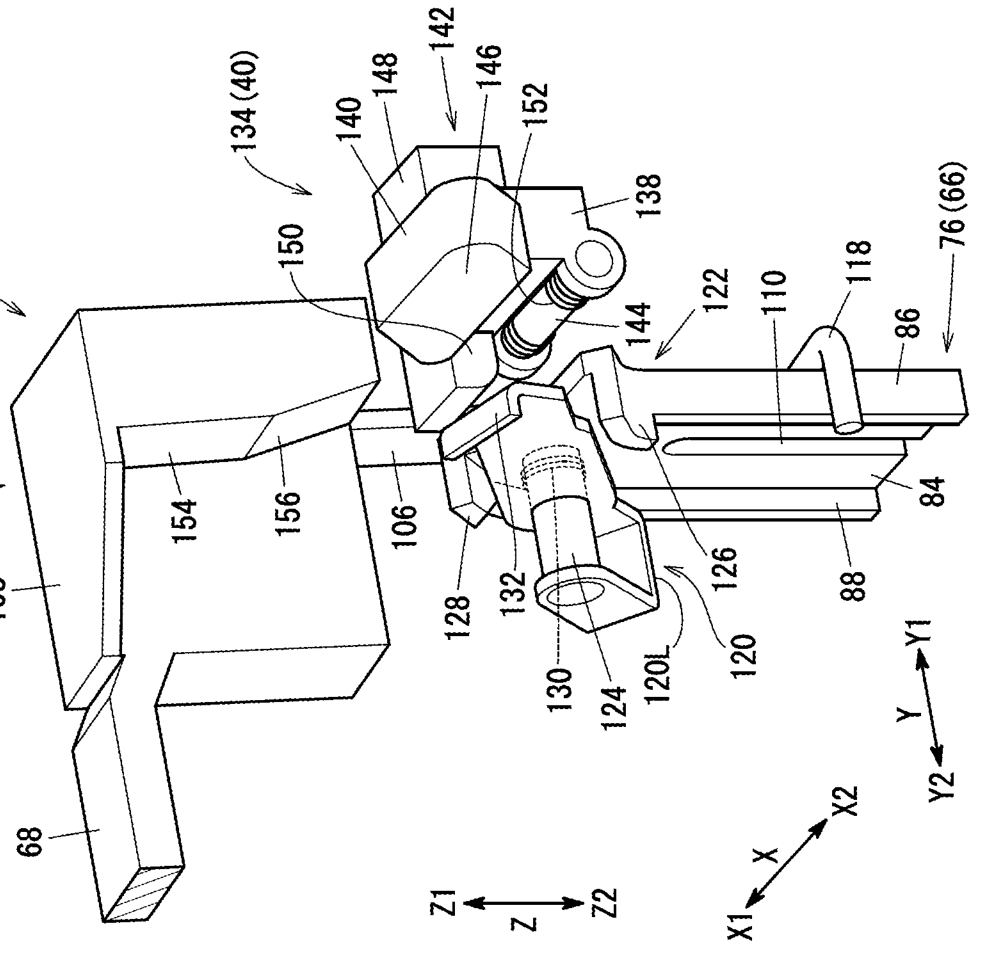

The rotational range limiting portion 122 is provided on the top end of the guide forming portion 84, which is curved toward the front surface side (arrow X2 side), and includes a front-surface-side abutment portion 126 and a back-surface-side abutment portion 128 as shown in FIGS. 14A and 14B. The front-surface-side abutment portion 126 is formed by the front-surface-side rib 86 extending beyond the engagement portion 120 toward the storage portion 30 side, when viewed in the arrow X direction. The back-surface-side abutment portion 128 is formed by the back-surface-side rib 88 extending beyond the engagement portion 120 toward the storage portion 30 side, when viewed in the arrow X direction.

The front-surface-side abutment portion 126 abuts against the bottom surface of the engagement portion 120, thereby restricting the engagement portion 120 from moving beyond the engagement orientation and rotating counterclockwise in FIG. 10. Furthermore, the back-surface-side abutment portion 128 abuts against the top surface of the engagement portion 120, thereby restricting the engagement portion 120 from moving beyond the disengagement orientation and rotating clockwise in FIG. 12.

As shown in FIG. 10, when the engagement portion 120 is in the engagement state with the engaged portion 54, the bottom portion 120L of the back surface side of the engagement portion 120 protrudes from the guide forming portion 84 in the arrow X1 direction (direction orthogonal to the insertion and removal direction, on the back surface side) to be placed on the engaged portion 54, and the bottom surface on the front surface side of the engagement portion 120 abuts against the front-surface-side abutment portion 126. On the other hand, as shown in FIG. 12, when the engagement portion 120 and the engaged portion 54 are in the disengagement state, the bottom portion 120L of the back surface side of the engagement portion 120 is arranged farther toward the front surface side than the engaged portion 54 and back plate 50, and the top surface of the back surface side of the engagement portion 120 abuts against the back-surface-side abutment portion 128. In the present embodiment, the bottom portion 120L of the back surface side of the engagement portion 120 has increased strength due to being curved back in a given direction.

As shown in FIGS. 14A and 14B, the engagement portion biasing member 130 formed by a torsion spring or the like, for example, is provided in the vicinity of the engagement portion rotational shaft 124. The engagement portion biasing member 130 elastically biases the engagement portion 120 in a direction to rotate to the engagement orientation side (counterclockwise direction in FIG. 10).

As shown in FIG. 10, when the portable portion body 66 is at the disconnection position (insertion and removal position) or farther upward, the bottom portion 120L of the back surface side of the engagement portion 120 is arranged farther upward than the back plate 50. Therefore, the engagement portion 120 is rotated to the engagement orientation by the elastic force of the engagement portion biasing member 130, and the bottom portion 120L of the back surface side of the engagement portion 120 protrudes farther than the guide forming portion 84 toward the back surface side.

At the disconnection position (insertion and removal position), when the engagement portion 120 enters the engagement state, the bottom portion 120L of the back surface side of the engagement portion 120 is placed on the engaged portion 54, and therefore the engagement portion 120 is restricted from rotating clockwise in FIG. 10. At this time, the engagement portion 120 is also restricted from rotating counterclockwise in FIG. 10 due to abutting against the front-surface-side abutment portion 126, and therefore the engagement orientation is maintained. In other words, the engagement portion 120 and engaged portion 54 are kept in the engagement state, and the portable portion body 66 is restricted from moving farther downward than the disconnection position (insertion and removal position).

Figure 11:
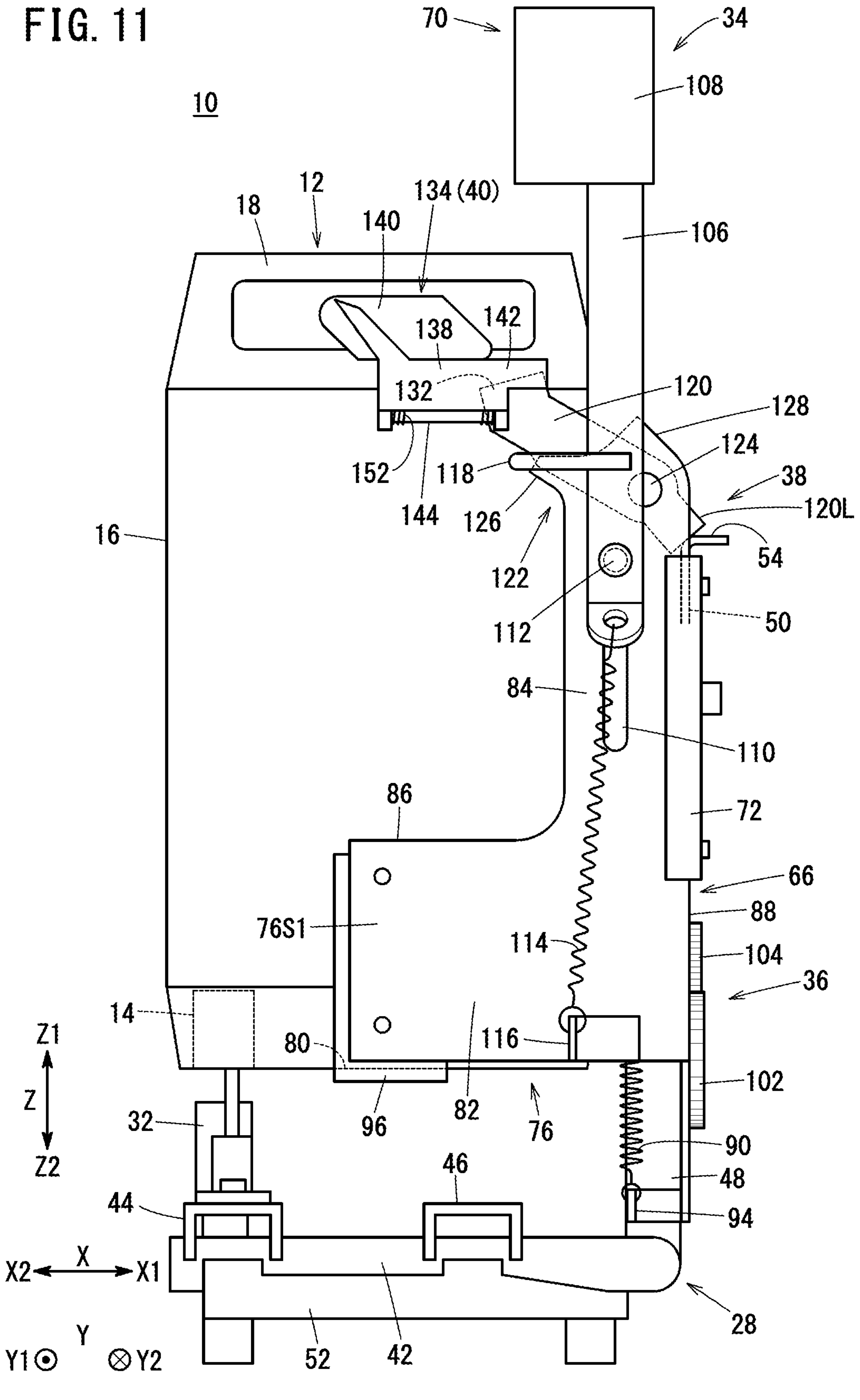
FIG. 11 is a descriptive diagram of the battery storage apparatus in a case where the battery terminal and the storage portion terminal are in the disconnected state, the engagement portion and the engaged portion are in the engagement state, the lock portion is in the unlocked state, and the operating portion has been moved upward in the insertion and removal direction.

The operation to switch the engagement portion 120 in the engagement state to the disengagement state can be performed via the disengagement portion 118 of the operating portion 70. Specifically, as shown in FIG. 11, the operating portion 70 is moved upward relative to the portable portion body 66, and the disengagement portion 118 abuts against the bottom surface of the front surface side of the engagement portion 120. In this state, as shown in FIG. 12, the operating portion 70 is moved in a disengagement direction, which is different from the insertion and removal direction, relative to the portable portion body 66. In the present embodiment, the disengagement direction is a direction whereby the extension direction of the operating portion body 106 is inclined relative to the insertion and removal direction, when viewed in the arrow Y direction, such that the grip portion 68 of the operating portion 70 moves toward the outer side (arrow X1 side) of the storage space 58, when viewed in the insertion and removal direction.

Due to this, the disengagement portion 118 causes the engagement portion 120 to rotate clockwise in FIG. 12 toward the disengagement orientation, against the elastic force of the engagement portion biasing member 130. As a result, the bottom portion 120L of the back surface side of the engagement portion 120 moves from above the engaged portion 54 toward the arrow X2 side, thereby dissolving the engagement between the engagement portion 120 and the engaged portion 54. As shown in FIG. 13, when the engagement portion 120 enters the disengagement state and the portable portion body 66 moves farther downward than the disconnection position (insertion and removal position) due to the weight of the battery 12 itself or the elastic biasing force of the operating portion biasing member 114, for example, the bottom portion 120L of the back surface side of the engagement portion 120 becomes arranged farther downward than the engaged portion 54 and opposes the back plate 50.

Therefore, due to the bottom portion 120L of the back surface side of the engagement portion 120 abutting against the back plate 50, the engagement portion 120 can be restricted from rotating to the engagement orientation side (counterclockwise in FIG. 13). In other words, when the portable portion body 66 is farther downward than the disconnection position (insertion and removal position), even if the disengagement portion 118 moves away from the engagement portion 120, the engagement portion 120 can be kept in the disengagement orientation against the elastic force of the engagement portion biasing member 130.

A lock switching portion 132 is provided integrally on the top portion of the front surface side of the engagement portion 120. The lock switching portion 132 moves in conjunction with the movement of the portable portion body 66 in the insertion and removal direction, to switch the lock portion 40 between a locked state and an unlocked state. The details of the lock switching portion 132 are described along with the details of the lock portion 40.

As shown in FIGS. 7 and 13, when the portable portion body 66 is at the connection position (holding position), the lock portion 40 is in the locked state in which the battery 12 is held in a fixed manner relative to the storage portion 30. That is, the lock portion 40 holds the battery 12 in a fixed manner at the connection position (holding position) in the storage space 58. Furthermore, as shown in FIGS. 4 and 10, when the portable portion body 66 is at the disconnection position (insertion and removal position), the lock portion 40 is in the unlocked state in which the fixed hold of the battery 12 relative to the storage portion 30 is released.

In the present embodiment, as shown in FIG. 3, the lock portion 40 includes a first lock portion 134 that is attached to the top end side of a side wall forming the first side surface (not shown in the drawings) of the storage portion 30 and a second lock portion 136 that is attached to the top end side of a side wall forming the second side surface 30S2 of the storage portion 30. In a case where no distinction is made between the first lock portion 134 and the second lock portion 136, these lock portions are referred collectively as the lock portion 40.

The first lock portion 134 includes a lock portion body 138, a battery abutting portion 140, a lock fixing wall 142, and a lock rotating shaft 144. The lock portion body 138 is fixed to the storage portion 30 in a rotatable manner, via the lock rotating shaft 144. As shown in FIG. 7, when the first lock portion 134 is in the locked state, the lock rotating shaft 144 is arranged at the arrow-Y1-side end portion of the lock portion body 138, the battery abutting portion 140 is arranged at the arrow-Y2-side end portion of the lock portion body 138, and the lock fixing wall 142 is arranged at the arrow-X1-side end portion of the lock portion body 138.

Figure 15B:
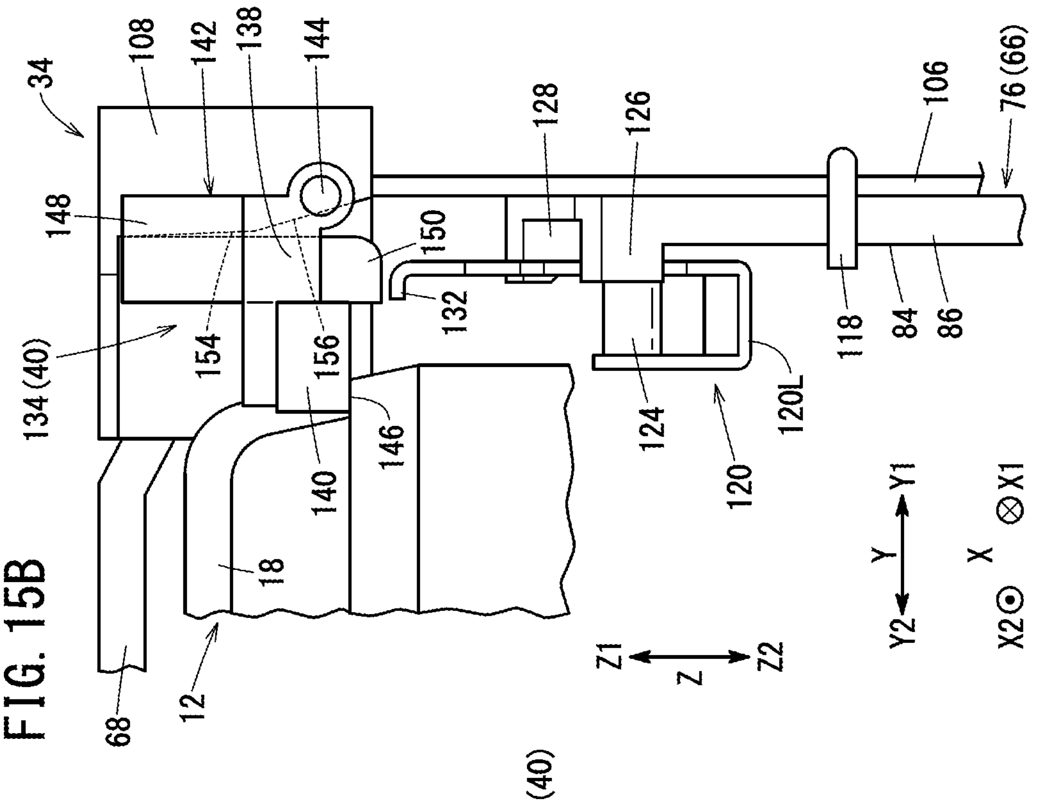
FIG. 15A is a descriptive diagram of an enlarged perspective view of essential parts describing the lock portion and lock switching portion in the unlocked state and the lock fixing portion not engaged with the lock portion and FIG. 15B is a front view of FIG. 15A.
Figure 15A:
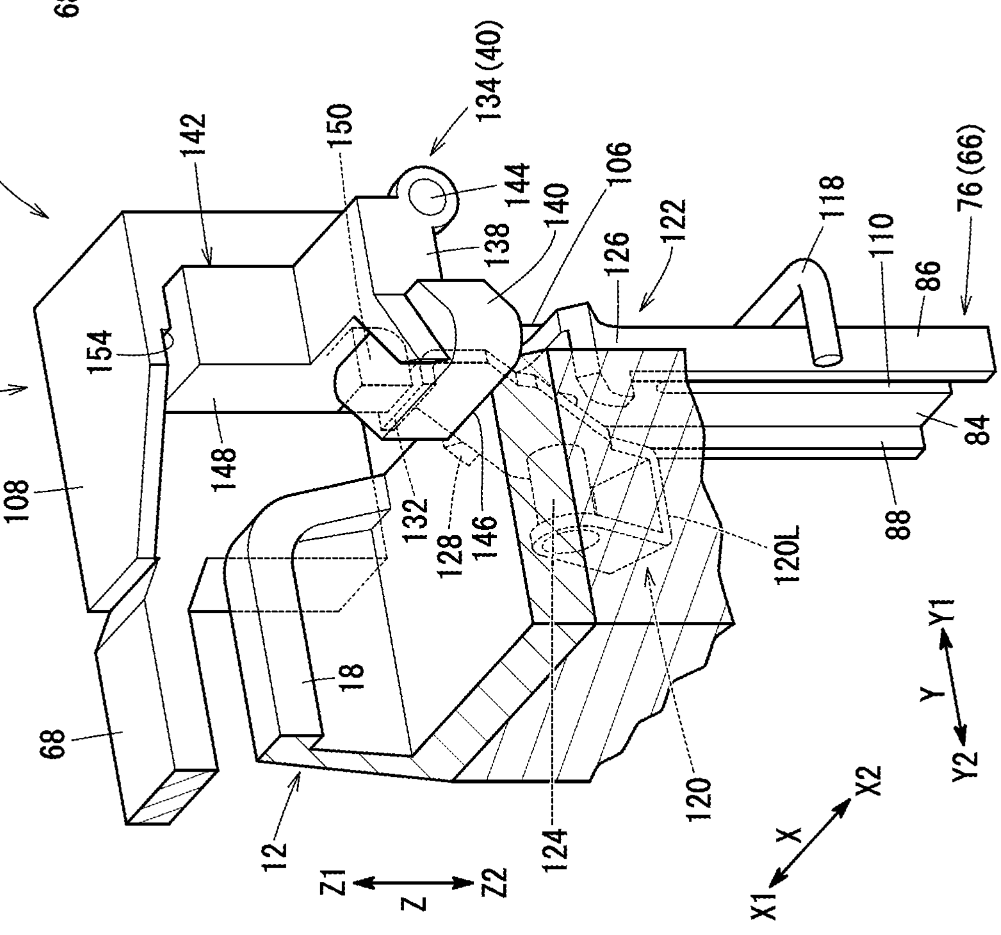

The battery abutting portion 140 includes an abutment surface 146 that abuts against the top end of the battery 12 when the first lock portion 134 is in the locked state. The abutment surface 146 of the battery abutting portion 140 is preferably formed of an elastic member. As shown in FIGS. 15A and 15B, when the first lock portion 134 is in the locked state, the lock fixing wall 142 extends both farther upward and farther downward than the lock portion body 138. When the first lock portion 134 is in the locked state, the portion of the lock fixing wall 142 extending farther upward than the lock portion body 138 forms a lock engaging portion 148 that is capable of engaging with the lock fixing portion 108 of the operating portion 70, as described further below. The lock rotating shaft 144 is arranged on the outer side of the opening 56 of the storage portion 30, when viewed in the insertion and removal direction.

By rotating counterclockwise in FIG. 15B centered on the lock rotating shaft 144, the first lock portion 134 enters the locked state in which the abutment surface 146 of the battery abutting portion 140 abuts against the top end of the battery 12 as described above. At this time, the battery 12 is pressed toward the bottom plate portion 80 of the portable portion body 66 by the battery abutting portion 140, to be held in a fixed manner relative to the storage portion 30.

On the other hand, by rotating clockwise in FIG. 14B centered on the lock rotating shaft 144, the first lock portion 134 enters the unlocked state in which the battery abutting portion 140 is away from the top end of the battery 12. As shown in FIG. 3, when in the unlocked state, the entire first lock portion 134 is arranged outside the opening 56 of the storage portion 30, when viewed in the insertion and removal direction. Furthermore, as shown in FIGS. 14A and 14B, when the first lock portion 134 is in the unlocked state, the battery abutting portion 140 extends upward from the lock portion body 138, and the lock fixing wall 142 extends beyond the lock portion body 138 to both the arrow Y1 side and the arrow Y2 side. The portion of the lock fixing wall 142 extending beyond the lock portion body 138 to the storage portion 30 side (arrow Y2 side) when the first lock portion 134 is in the unlocked state is provided with a cam portion 150 capable of engaging with the lock switching portion 132 of the engagement portion 120, as described further below.

The second lock portion 136 is configured in the same manner as the first lock portion 134, except that the second lock portion 136 is symmetric (mirror symmetry) to the first lock portion 134 with respect to the XZ plane. In other words, when the second lock portion 136 is in the locked state, the lock rotating shaft 144 is arranged at the arrow-Y2-side end portion of the lock portion body 138 and the battery abutting portion 140 is arranged at the arrow-Y1-side end portion of the lock portion body 138. Furthermore, the second lock portion 136 enters the locked state by rotating clockwise in FIG. 15B centered on the lock rotating shaft 144, and enters the unlocked state by rotating counterclockwise in FIG. 14B.

The lock portion 40 is elastically biased around the lock rotating shaft 144 by a lock portion biasing member 152 made of a torsion spring or the like, for example. In the present embodiment, the lock portion biasing member 152 elastically biases the lock portion 40 in the rotational direction toward the locked state side. That is, the first lock portion 134 is elastically biased counterclockwise in FIG. 15B by the lock portion biasing member 152, and the second lock portion 136 is elastically biased clockwise in FIG. 15B by the lock portion biasing member 152.

The lock portion 40 is restricted from rotating beyond a prescribed range in both the clockwise and counterclockwise directions, by a rotation restricting mechanism or the like (not shown in the drawings).

The lock switching portion 132 restricts, in a releasable manner, the rotation of the lock portion 40. As described above, the lock switching portion 132 is provided integrally on the top portion of the front surface side of the engagement portion 120. Therefore, in accordance with the portable portion body 66 moving in the insertion and removal direction between the disconnection position (insertion and removal position) and the connection position (holding position), the lock switching portion 132 also moves in the insertion and removal direction.

When the portable portion body 66 is at the disconnection position (insertion and removal position), as shown in FIGS. 14A and 14B, the lock switching portion 132 abuts against the cam portion 150 of the lock fixing wall 142. Due to this, the lock portion 40 is kept in a state of being rotated to the unlocked state side against the elastic force of the lock portion biasing member 152. That is, when the portable portion body 66 is at the disconnection position (insertion and removal position), the lock switching portion 132 puts the lock portion 40 in the unlocked state and restricts the lock portion 40 from pivoting to the locked state side.

On the other hand, when the portable portion body 66 is at the connection position (holding position), as shown in FIGS. 15A and 15B, the lock switching portion 132 moves downward away from the cam portion 150 of the lock fixing wall 142. Due to this, the restriction on the lock portion 40 rotating toward the locked state side is removed. Therefore, the lock portion 40 enters the locked state due to the elastic force of the lock portion biasing member 152.

With the lock portion 40 in the locked state, the lock engaging portion 148 extends upward from the lock portion body 138, as described above. In this state, when the operating portion 70 moves from top to bottom relative to the portable portion body 66 and storage portion 30, the lock engaging portion 148 is inserted into an engagement groove 154 provided in the lock fixing portion 108 of the operating portion 70.

When the lock engaging portion 148 of the first lock portion 134 is inserted into the engagement groove 154, the side surface of the lock engaging portion 148 on the arrow Y1 side abuts against the inner side surface of the engagement groove 154 of the lock fixing portion 108. That is, the rotation of the first lock portion 134 centered on the lock rotating shaft 144 is restricted due to the first lock portion 134 abutting against both the top end of the battery 12 and the lock fixing portion 108, thereby keeping the first lock portion 134 fixed in the locked state. In the same manner, when the lock engaging portion 148 of the second lock portion 136 is inserted into the engagement groove 154, the side surface of the lock engaging portion 148 on the arrow Y2 side abuts against the inner side surface of the engagement groove 154 of the lock fixing portion 108. That is, the rotation of the second lock portion 136 centered on the lock rotating shaft 144 is restricted due to the second lock portion 136 abutting against both the top end of the battery 12 and the lock fixing portion 108, thereby keeping the second lock portion 136 fixed in the locked state.

For each of the first lock portion 134 and the second lock portion 136, a inclined portion 156 (FIG. 14A) is provided, on the inner side surface of the engagement groove 154, with an incline in a direction becoming closer to the side surface of the lock engaging portion 148 the farther it progresses from the bottom end side toward the top side, when viewed in the arrow X direction. Therefore, the farther the lock engaging portion 148 is inserted from the bottom end side of the engagement groove 154 toward the top side, the greater the force applied via the inner side surface of the engagement groove 154 to direct the lock engaging portion 148 toward the locked state side in the rotational direction. As a result, it becomes possible to increase the pressing force on the battery 12 caused by the battery abutting portion 140 while making it easy to insert the lock engaging portion 148 into the engagement groove 154, that is, it becomes possible to increase the fixed holding force applied to the battery 12 by the lock portion 40.

When the operating portion 70 moves upward relative to the portable portion body 66 and the storage portion 30 from a state where the lock fixing portion 108 and the lock engaging portion 148 are engaged, the lock engaging portion 148 is removed from the engagement groove 154. Due to this, the engagement between the lock fixing portion 108 and the lock engaging portion 148 is dissolved. As shown in FIGS. 4 and 10, in the state where the lock fixing portion 108 is not engaged with the lock engaging portion 148, when the operating portion 70 is left free, the operating portion 70 adopts an orientation and arrangement according to the elastic bias applied by the operating portion biasing member 114. Therefore, by inclining the operating portion body 106 relative to the extension direction of the guide portion 110, when viewed in the arrow Y direction, the grip portion 68 becomes arranged on the outer side (arrow X1 side) of the storage space 58 when viewed in the insertion and removal direction. Furthermore, the fastener 112 of the operating portion body 106 abuts against the bottom end of the guide portion 110.

As shown in FIG. 2, the dimensions of the battery storage apparatus 10 relative to the dimensions of the battery 12 are set such that, when the portable portion body 66 (FIG. 3) is at the disconnection position (insertion and removal position), the top end side of the battery 12 supported by the portable portion body 66, as well as the lock fixing portion 108 and the grip portion 68 (FIG. 3) of the operating portion 70, protrude a prescribed length upward from the opening 56 of the storage portion 30. Therefore, in a case where the portable portion body 66 supporting the battery 12 is at the disconnection position (insertion and removal position), the opening and closing portion 26 is restricted from entering a closed state and covering the opening 56 due to interference from the top end portion of the battery 12 and the grip portion 68 and lock fixing portion 108.

On the other hand, as shown in FIG. 1, when the portable portion body 66 is at the connection position (holding position), the battery 12 is arranged farther toward the bottom side of the storage portion 30 than when the portable portion body 66 (FIG. 8) is at the disconnection position (insertion and removal position). Due to this, the length that the top end side of the battery 12 and the grip portion 68 and the lock fixing portion 108 protrude from the opening 56 of the storage portion 30 is decreased. Therefore, in a case where the portable portion body 66 supporting the battery 12 is at the connection position (holding position), the opening and closing portion 26 can be set to the closed state.

With the battery storage apparatus 10 of the present embodiment, in a case where an attempt is made to put the opening and closing portion 26 in the closed state while the battery 12 is not stored in the storage space 58, for example, it is still necessary for the portable portion body 66 to move to the connection position (holding position). At this time, as described above, the portable portion body 66 is elastically biased toward the bottom side (connection position side, holding position side) in the up-down direction by the first body biasing member 90 and the second body biasing member 91. Therefore, by dissolving the engagement between the engagement portion 120 and the engaged portion 54 with the restricting portion 38, the portable portion body 66 moves to the connection position (holding position) against the braking force of the damping portion 36, and can be kept at the connection position (holding position).

The battery storage apparatus 10 according to the present embodiment is basically configured as described above. The following describes, as an example of an operation of attaching and detaching the battery 12 to and from the battery storage apparatus 10, a case in which an operation is started to store the battery 12 in the storage space 58 from a state in which the opening and closing portion 26 (FIG. 1) is in the closed state and the portable portion body 66 (FIG. 3) is in the connection position (holding position). In this case, first, the portable portion body 66 is moved to the disconnection position (insertion and removal position) after the opening 56 of the storage portion 30 is exposed with the opening and closing portion 26 in the open state.

In other words, the portable portion body 66 is moved relative to the storage portion 30 along with the operating portion 70 due to the grip portion 68 being gripped and the operating portion 70 being pulled upward in the insertion and removal direction, for example. Due to this, as shown in FIG. 3, when the portable portion body 66 reaches the disconnection position (insertion and removal position), the engagement portion 120 rotates to the engagement orientation due to the elastic bias of the engagement portion biasing member 130. Therefore, the bottom portion 120L of the back surface side of the engagement portion 120 protrudes beyond the guide forming portion 84 to be placed on the engaged portion 54, and the engagement portion 120 and engaged portion 54 enter the engagement state. As a result, the movement of the portable portion body 66 toward the side (downward side) of the connection position (holding position) is restricted.

After the portable portion body 66 has reached the disconnection position (insertion and removal position) in the manner described above, the gripping of the grip portion 68 is released. Due to this, the operating portion 70 adopts an orientation and arrangement according to the elastic bias caused by the operating portion biasing member 114. That is, due to the operating portion body 106 being inclined relative to the extension direction of the guide portion 110, the grip portion 68 is arranged outside the storage space 58, when viewed in the insertion and removal direction.

Furthermore, due to the portable portion body 66 being in the disconnection position (insertion and removal position), as shown in FIGS. 14A and 14B, the lock switching portion 132 abuts against cam portion 150 of the lock fixing wall 142 to keep the lock portion 40 in the unlocked state. Therefore, as shown in FIG. 3, the lock portion 40 is arranged outside the opening 56 of the storage portion 30, when viewed in the insertion and removal direction. That is, the grip portion 68 and the lock portion 40 are arranged to not overlap with the opening 56 in the insertion and removal direction.

Next, as an example, the battery grip portion 18 is gripped and the orientation of the battery terminal 14 is aligned with the storage portion terminal 32. In this state, as shown in FIGS. 4 and 10, the battery 12 is inserted into the storage space 58 through the opening 56 of the storage portion 30 along the insertion and removal direction, and placed on the bottom plate portion 80 of the portable portion body 66. At this time, as described above, the portable portion body 66 is restricted from moving from the disconnection position (insertion and removal position) to the connection position (holding position) by the restricting portion 38 (engagement portion 120 and engaged portion 54). Therefore, the battery 12 is supported by the portable portion body 66 at the disconnection position (insertion and removal position).

Figure 5:
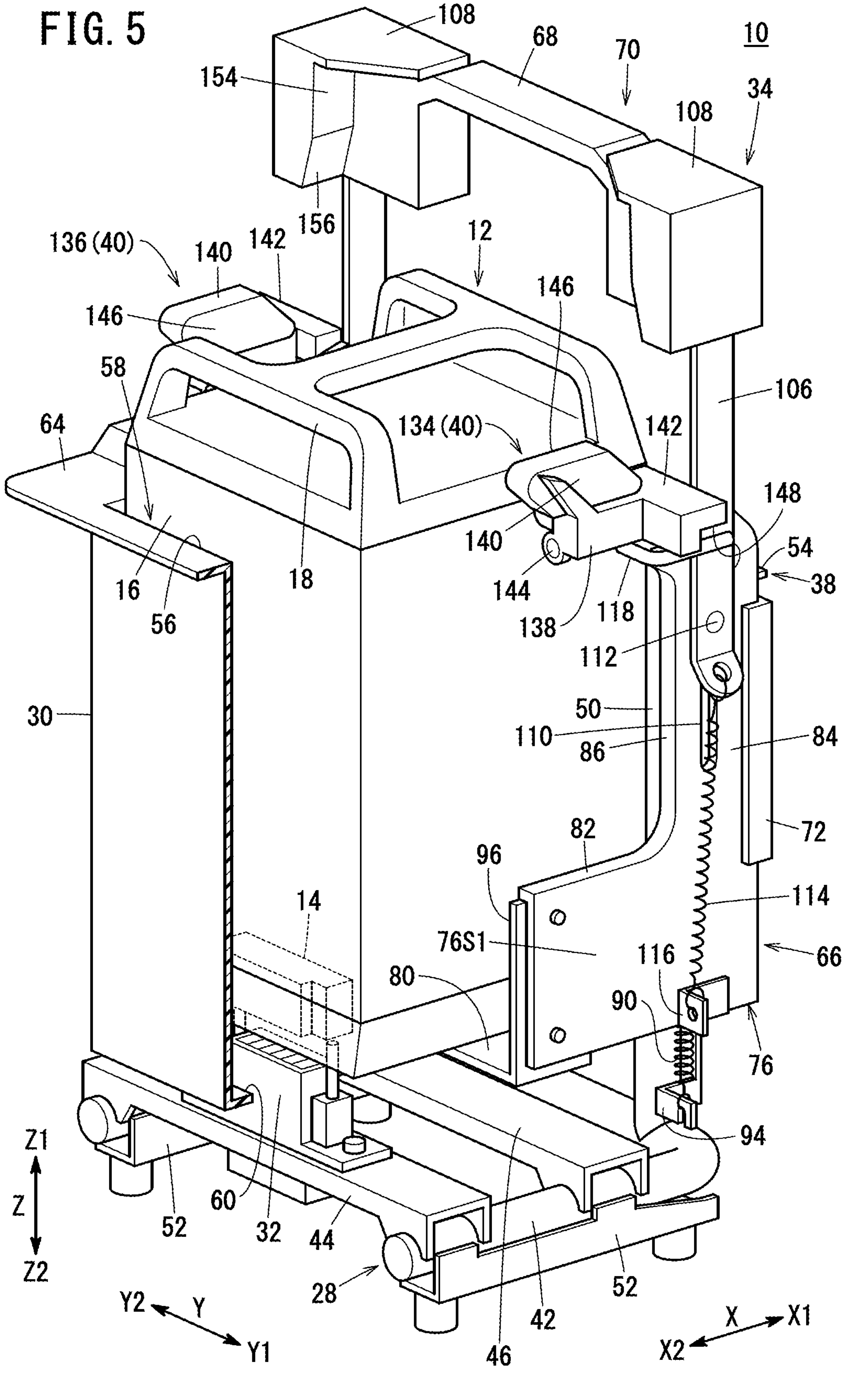
FIG. 5 is a descriptive diagram of the battery storage apparatus when the operating portion of FIG. 4 has been moved upward in the insertion and removal direction relative to the storage portion and the portable portion body.
Figure 6:
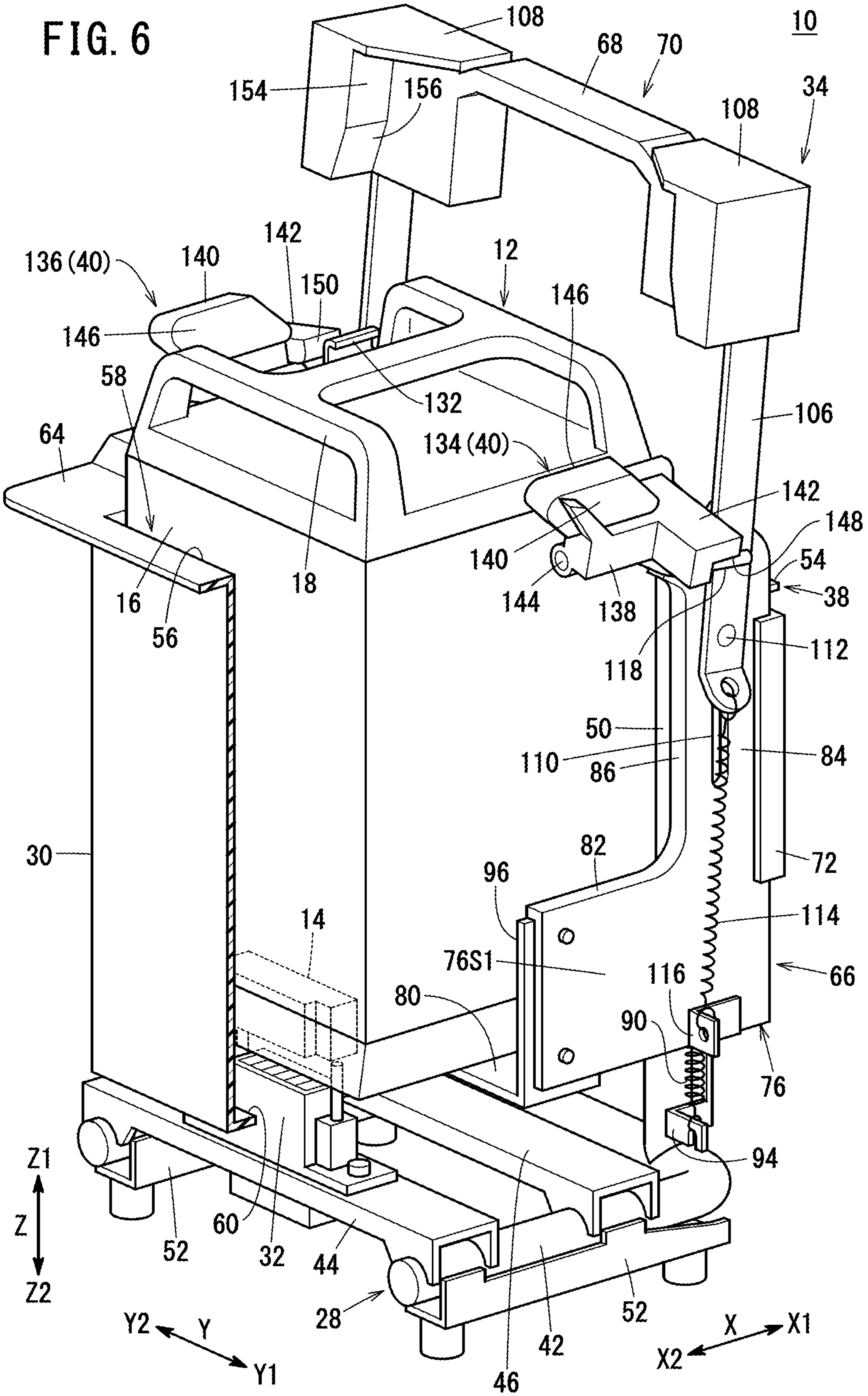
FIG. 6 is a descriptive diagram of the battery storage apparatus when the operating portion of FIG. 5 is moved in a dissolution direction to dissolve the engagement between the engaging portion and the engaged portion.

Next, as shown in FIGS. 5 and 11, the grip portion 68 is gripped and the operating portion 70 is moved upward in the insertion and removal direction relative to the portable portion body 66, for example. Due to this, as shown in FIG. 11, the disengagement portion 118 abuts against the bottom surface of the front surface side of the engagement portion 120. In this state, as shown in FIGS. 6 and 12, the operating portion 70 is moved in the disengagement direction relative to the portable portion body 66. Therefore, as shown in FIG. 12, the engagement portion 120 is rotated to the disengagement orientation against the elastic force of the engagement portion biasing member 130, and the bottom portion 120L of the back surface side of the engagement portion 120 can be moved farther toward the arrow X2 side than the engaged portion 54. As a result, the engagement between the engagement portion 120 and the engaged portion 54 is dissolved, thereby entering the disengagement state.

Upon entering the disengagement state, the portable portion body 66 moves toward the connection position (holding position), which is farther downward than the disconnection position (insertion and removal position), due to the weight of the battery 12 itself and the elastic biasing force of the first body biasing member 90 and the second body biasing member 91. At this time, since the rack forming portion 98 moves integrally with the portable portion body 66, at the damping portion 36, the rotary damper 102 rotates in the counterclockwise direction in FIG. 9 producing a braking force via the rack 100 and the idle gear 104. Due to this, the movement speed of the portable portion body 66 from the disconnection position (insertion and removal position) toward the connection position (holding position) is attenuated.

As shown in FIG. 7, when the portable portion body 66 reaches the connection position (holding position), the battery terminal 14 of the battery 12 being supported by the portable portion body 66 contact and becomes connected to the storage portion terminal 32. Furthermore, due to the portable portion body 66 being at the connection position (holding position), the lock switching portion 132 of the engagement portion 120 is apart from the cam portion 150 of the lock fixing wall 142, as shown in FIGS. 15A and 15B. Due to this, the lock portion 40 rotates due to the elastic bias of the lock portion biasing member 152 to enter the locked state. Therefore, the abutment surface 146 of the battery abutting portion 140 abuts against the top end of the battery 12. Furthermore, the lock engaging portion 148 extends upward from the lock portion body 138.

Figure 8:
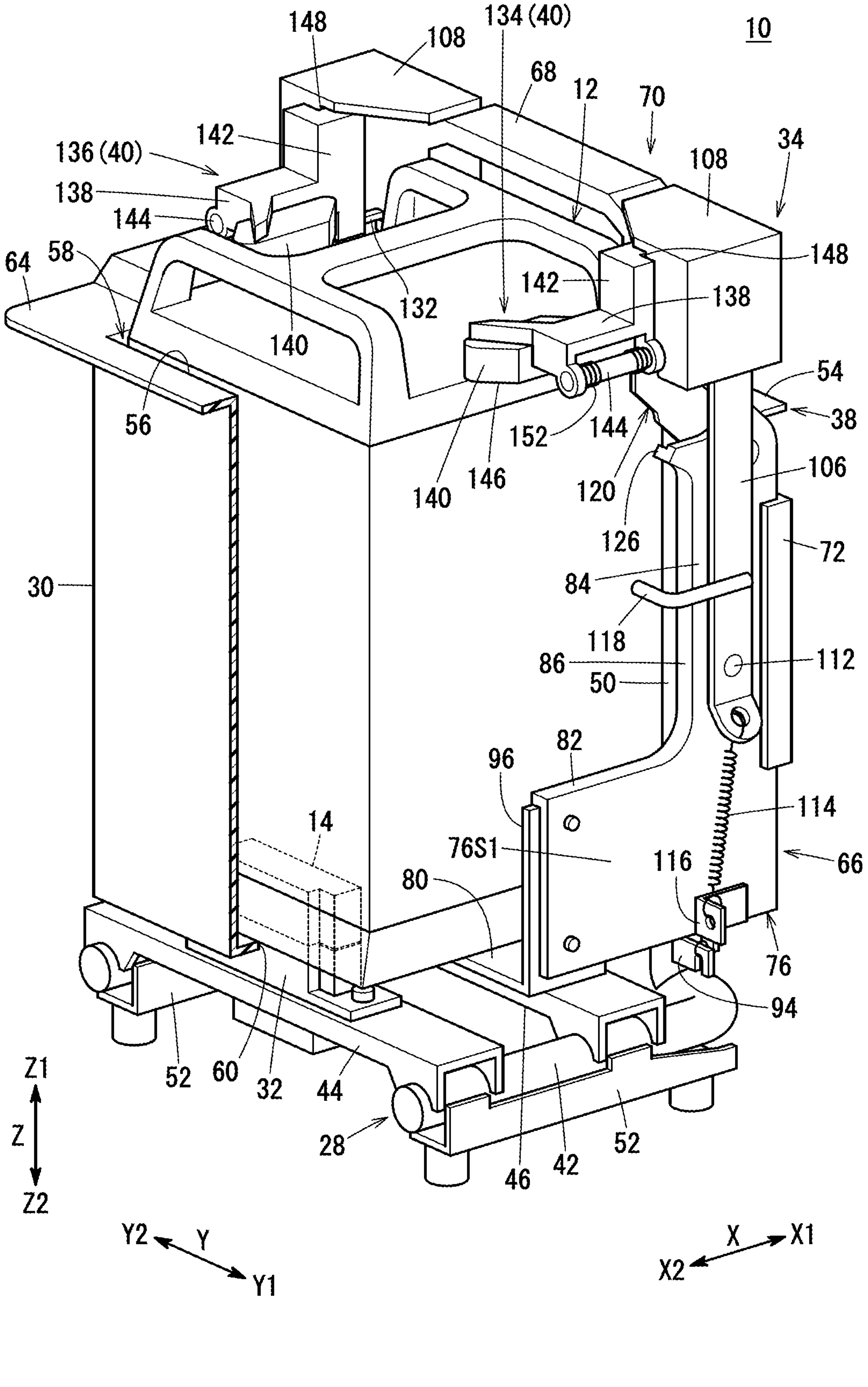
FIG. 8 is a descriptive diagram of the battery storage apparatus when the lock portion of FIG. 7 is engaged with the lock fixing portion of the operating portion.

Next, as shown in FIGS. 8 and 13, the operating portion 70 moves from top to bottom relative to the portable portion body 66 and the storage portion 30, and the lock engaging portion 148 is inserted into the engagement groove 154 of the lock fixing portion 108. Due to this, the lock portion 40 abuts against both the top end of the battery 12 and the lock fixing portion 108, and the rotation thereof centered on the lock rotating shaft 144 is restricted. Furthermore, the lock portion 40 is provided, via the inner side surface of the engagement groove 154, with a force causing the lock engaging portion 148 to move toward the locked state side in the rotational direction. Due to this, the battery 12 is pressed toward the bottom plate portion 80 of the portable portion body 66 via the battery abutting portion 140.

As described above, the portable portion body 66 supporting the battery 12 is moved to the connection position (holding position) and the operating portion 70 is moved downward in the insertion and removal direction to a position where the lock fixing portion 108 is engaged with the lock engaging portion 148, after which the opening and closing portion 26 is set to the closed state as necessary. Due to this, the battery 12 is stored in the battery storage apparatus 10.

Next, the operation of removing the battery 12 from the battery storage apparatus 10 will be described. In this case, after the opening and closing portion 26 (FIG. 1) is set to the open state, basically, in the same manner as the operation by which the portable portion body 66 described above is moved from the connection position (holding position) to the disconnection position (insertion and removal position), the portable portion body 66 is moved along with the battery 12 from the connection position (holding position) to the disconnection position (insertion and removal position).

In other words, by gripping the grip portion 68 and pulling the operating portion 70 upward in the insertion and removal direction, for example, the portable portion body 66 is moved upward relative to the storage portion 30. At this time, the battery 12 supported by the portable portion body 66 also moves upward, along with the portable portion body 66, relative to the storage portion 30. Due to this, as shown in FIGS. 6 and 11, when the battery 12 and the portable portion body 66 reach the disconnection position (insertion and removal position), the storage portion terminal 32 and the battery terminal 14 move away from each other to become disconnected.

Furthermore, when the battery 12 and the portable portion body 66 reach the disconnection position (insertion and removal position), the engagement portion 120 and engaged portion 54 enter the engagement state. That is, the movement of the battery 12 and portable portion body 66 toward the connection position (holding position) side is restricted by the restricting portion 38. Therefore, even when the grip on the grip portion 68 is released, the battery 12 and the portable portion body 66 are restricted from returning back toward the connection position (holding position) from the disconnection position (insertion and removal position).

Furthermore, due to the portable portion body 66 moving to the disconnection position (insertion and removal position) side, as shown in FIGS. 14A and 14B, the lock switching portion 132 abuts against the cam portion 150 of the lock fixing wall 142, and therefore the lock portion 40 enters the unlocked state. That is, the battery 12 is released from being locked by the lock portion 40.

Therefore, the battery grip portion 18 is gripped instead of the grip portion 68 of the operating portion 70 and the battery 12 is moved upward in the insertion and removal direction relative to the storage portion 30 and the portable portion body 66, for example, thereby making it possible to remove the battery 12 from the storage space 58 through the opening 56.

As described above, with the battery storage apparatus 10 according to the present embodiment, when the battery 12 is stored in the storage space 58, the movement of the portable portion 34 (portable portion body 66) supporting the battery 12 is restricted by the restricting portion 38, thereby making it possible to stop the battery 12 at the disconnection position before the connection position is reached. After this, by removing the restriction caused by the restricting portion 38, the battery 12 is moved from the disconnection position to the connection position, and the battery terminal 14 and storage portion terminal 32 can be connected to each other. That is, it is possible to perform, in stages, the operation of inserting the battery 12 to the disconnection position relative to the storage portion 30 and the operation of inserting the battery 12 from the disconnection position to the connection position to connect the battery terminal 14 and the storage portion terminal 32.

Furthermore, in a case where the battery 12 stored in the storage space 58 is being removed, when the battery 12 supported by the portable portion 34 moves from the connection position to the disconnection position, the connection between the battery terminal 14 and the storage portion terminal 32 can be dissolved. In this way, the battery 12 that has been moved from the connection position to the disconnection position is restricted from moving toward (returning back to) the connection position by the restricting portion 38. Therefore, it is possible to perform, in stages, the operation of dissolving the connection between the battery terminal 14 and the storage portion terminal 32 and moving the battery 12 to the disconnection position and the operation of moving the battery 12 at the disconnection position farther to remove the battery 12 from the storage portion 30.

Accordingly, with this battery storage apparatus 10, there is no need to perform, in series, the operation of inserting and removing the battery 12 into and from the storage portion 30 and the operation of attaching and detaching the storage portion terminal 32 and the battery terminal 14. Therefore, impact caused by collisions on the battery terminal 14 and storage portion terminal 32, for example, can be easily restricted, and the battery terminal 14 and storage portion terminal 32 can be well protected.

At the disconnection position of the battery storage apparatus 10 according to the embodiment described above, the battery terminal 14 of the battery 12 supported by the portable portion 34 (portable portion body 66) is arranged near or adjacent to the storage portion terminal 32. In this way, by setting the disconnection position to be close to the connection position, it is possible to effectively restrict the occurrence of impact caused by collisions on the storage portion terminal 32 and the battery terminal 14. Therefore, it is possible to better protect the battery terminal 14 and the storage portion terminal 32. The disconnection position is not limited to the arrangement described above as long as the battery terminal 14 of the battery 12 supported by the portable portion body 66 is at any position in the storage space 58 resulting in being disconnected from the storage portion terminal 32.

With the battery storage apparatus 10 according to the embodiment described above, the damping portion 36 is included that attenuates the movement speed of the portable portion 34 (portable portion body 66) moving from the disconnection position toward the connection position. In this case, it is possible to effectively restrict the occurrence of impact caused by collisions on the storage portion terminal 32 and the battery terminal 14. Therefore, it is possible to better protect the battery terminal 14 and the storage portion terminal 32.

In the embodiment described above, the damping portion 36 is formed from the rack 100, the rotary damper 102, and the idle gear 104, but the damping portion 36 is not particularly limited to this. A widely known configuration capable of attenuating the movement speed of the portable portion body 66 from the disconnection position toward the connection position can be adopted as the damping portion 36.

The restricting portion 38 of the battery storage apparatus 10 according to the embodiment described above includes the engagement portion 120 provided to the portable portion 34 (portable portion body 66) and the engaged portion 54 that is positionally fixed relative to the storage portion terminal 32, and the movement of the portable portion 34 from the disconnection position toward the connection position is restricted by the engagement portion 120 and the engaged portion 54 being engaged with each other at the disconnection position. In this case, the movement of the portable portion body 66 from the disconnection position toward the connection position can be restricted by a relatively simple configuration.

The portable portion 34 of the battery storage apparatus 10 according to the embodiment described above includes the portable portion body 66 that supports the battery 12 and the operating portion 70 that is provided with the grip portion 68 that can be gripped by a worker, and the portable portion body 66 can be moved in the insertion and removal direction between the connection position and the disconnection position by moving the operating portion 70 relative to the storage portion 30 in the insertion and removal direction of the battery 12 through the opening 56. In this case, the operability when moving the battery 12 between the disconnection position and the connection position can be improved.

The operating portion 70 of the battery storage apparatus 10 according to the embodiment described above is capable of moving relative to the portable portion body 66, and the operating portion 70 is provided with the disengagement portion 118 that dissolves the engagement between the engagement portion 120 and the engaged portion 54 by moving the operating portion 70 relative to the portable portion body 66 in the disengagement direction, which is different from the insertion and removal direction. By setting the disengagement direction to be different from the insertion and removal direction in this way, when the battery 12 is inserted into the storage space 58, the engagement portion 120 and engaged portion 54 can be restricted from unintentionally disengaging. Therefore, it is possible to improve the operability of the battery storage apparatus 10, and also to better protect the battery terminal 14 and the storage portion terminal 32.

The portable portion body 66 of the battery storage apparatus 10 according to the embodiment described above is provided with the guide portion 110 that extends in the insertion and removal direction and guides the movement of the operating portion 70 relative to the portable portion body 66; the grip portion 68 is arranged on a side opposite the storage portion terminal 32 from the operating portion 70 in the insertion and removal direction; and the operating portion 70 is provided with the operation portion biasing member 114 that causes the operating portion 70 to be inclined relative to the extension direction of the guide portion 110 and elastically biases the grip portion 68 toward the outside of the opening 56. In this case, by guiding the relative movement of the operating portion 70 with the guide portion 110, it is possible to improve the operability of the battery storage apparatus 10.

Furthermore, by elastically biasing the operating portion 70 in the direction described above with the operating portion biasing member 114, it is possible to easily prevent the grip portion 68 from interfering with the operation of inserting and removing the battery 12 to and from the storage space 58 through the opening 56, for example. Due to this as well, it is possible to improve the operability of the battery storage apparatus 10.

The engagement portion 120 of the battery storage apparatus 10 according to the embodiment described above is rotatable and switches between an engagement state of being engaged with the engaged portion 54 and a disengagement state in which the engagement with the engaged portion 54 is dissolved, due to the rotation of the engagement portion 120; the engagement portion 120 is provided with the engagement portion biasing member 130 that elastically biases the engagement portion 120 in a direction to rotate toward the engagement state side; and the operating portion 70 is moved in the disengagement direction, thereby causing the disengagement portion 118 to rotate the engagement portion 120 against the elastic force of the engagement portion biasing member 130 to enter the disengagement state. In this case, it is possible to switch between the engagement state and the disengagement state for the engagement portion 120 and engaged portion 54, with a relatively simple configuration and operation.

The battery storage apparatus 10 according to the embodiment described above includes the opening and closing portion 26 that opens and closes the opening 56; when the portable portion 34 (portable portion body 66) is at the disconnection position, a portion of the battery 12 supported by the portable portion 34 (portable portion body 66) protrudes to the outside of the storage portion 30 through the opening 56, thereby restricting the opening and closing portion 26 from covering the opening 56 and entering the closed state; and when the portable portion 34 is at the connection position, the battery 12 is arranged farther inward in the storage portion 30 compared to when the portable portion 34 is at the disconnection position, thereby making it possible for the opening and closing portion 26 to enter the closed state.

In this case, in the state where the battery 12 is at the disconnection position, the opening and closing portion 26 can be prevented from entering the closed state, and therefore the connection state between the battery terminal 14 and storage portion terminal 32 can be easily confirmed. Furthermore, since the storage space 58 can be made relatively small compared to the size of the battery 12, the battery storage apparatus 10 can be formed to be smaller.

The storage space 58 of the battery storage apparatus 10 according to the embodiment described above is provided with the storage portion terminal 32 that can contact the battery terminal 14 provided on the battery 12; the holding position is the connection position at which the battery terminal 14 of the battery 12 held by the portable portion body 66 is connected to the storage portion terminal 32; the insertion and removal position is the disconnection position at which the battery terminal 14 of the battery 12 supported by the battery case 66 is disconnected from the storage portion terminal 32; and the battery storage apparatus 10 includes the restricting portion 38 that restricts, in a releasable manner, the movement of the portable portion body 66 from the insertion and removal position toward the holding position.

In this case, the operation of inserting the battery 12 to the insertion and removal position relative to the storage portion 30 and the operation of inserting the battery 12 from the insertion and removal position to the holding position to connect the battery terminal 14 and the storage portion terminal 32 can be performed in stages. Furthermore, the operation of dissolving the connection between the battery terminal 14 and storage portion terminal 32 and moving the battery 12 to the insertion and removal position and the operation of further moving the battery 12 at the insertion and removal position to remove the battery 12 from the storage portion 30 can be performed in stages.

In other words, there is no need to perform the operation of inserting or removing the battery 12 to or from the storage portion 30 and the operation of attaching or detaching the storage portion terminal 32 and battery terminal 14 to or from each other in series. Therefore, it is possible to easily restrict the occurrence of impact caused by collisions or the like on configurational elements of the battery 12 and the battery storage apparatus 10, particularly the occurrence of impact caused by collisions or the like on the battery terminal 14 and the storage portion terminal 32. It should be noted that the insertion and removal position may be set to a position different from the disconnection position.

With the battery storage apparatus 10 according to the embodiment described above, the restricting portion 38 includes the engagement portion 120 provided to the portable portion body 66 and the engaged portion 54 that is positionally fixed relative to the storage portion 30, and the movement of the portable portion body 66 from the insertion and removal position toward the holding position is restricted by engaging the engagement portion 120 and engaged portion 54 with each other. In this case, the movement of the portable portion body 66 from the insertion and removal position toward the holding position can be restricted by a relatively simple configuration.

With the battery storage apparatus 10 according to the embodiment described above, the lock switching portion 132 is provided integrally with the engagement portion 120, abuts against the lock portion 40 to restrict the rotation of the lock portion 40 when the portable portion body 66 is at the insertion and removal position, and moves away from the lock portion 40 to remove the restriction on the rotation of the lock portion 40 when the portable portion body 66 is at the holding position. In this case, the battery storage apparatus 10 can be simplified and can be made smaller with regard to the portion where the lock switching portion 132 and engagement portion 120 are provided integrally.

The battery storage apparatus 10 according to the embodiment described above includes the opening and closing portion 26 that opens and closes the opening 56; when the portable portion 34 (portable portion body 66) is at the insertion and removal position, a portion of the battery 12 supported by the portable portion body 66 (portable portion 34) protrudes to the outside of the storage portion 30 through the opening 56, thereby restricting the opening and closing portion 26 from covering the opening 56 to be in the closed state; and when the portable portion body 66 (portable portion 34) is at the holding position, the battery 12 is arranged further inward in the storage portion 30 compared to when the portable portion body 66 is at the insertion and removal position, thereby making it possible for the opening and closing portion 26 to enter the closed state.

In this case, in the state where the battery 12 is at the insertion and removal position, the opening and closing portion 26 can be prevented from entering the closed state, and therefore it can be easily confirmed whether the lock portion 40 is in the locked state. Furthermore, since the storage space 58 can be made relatively small compared to the size of the battery 12, the battery storage apparatus 10 can be formed to be smaller.

Further, the present invention is not limited to the above-described embodiment, and it goes without saying that various modifications could be adopted therein without departing from the essence and gist of the present invention.

LIST OF REFERENCE NUMERALS

10. Battery storage apparatus
12. Battery
14. Battery terminal
26. Opening and closing portion
30. Storage portion
32. Storage portion terminal
34. Portable portion
36. Damping portion
38. Restricting portion
40. Lock portion
54. Engaged portion
56. Opening
58. Storage space
66. Portable portion body
68. Grip portion
70. Operating portion
108. Lock fixing portion
110. Guide portion
114. Operating portion biasing member
118. Disengagement portion
120. Engagement portion
130. Engagement portion biasing member
132. Lock switching portion
144. Lock rotating shaft
152. Lock portion biasing member

The invention claimed is:

1. A battery storage apparatus configured to store a battery including a battery terminal, the battery storage apparatus comprising:

a storage portion that includes
an opening through which the battery is inserted and removed, and
a storage space that stores the battery in a manner so that the battery is attached and detached through the opening;
a storage portion terminal that is positionally fixed relative to the storage portion and is configured to connect with the battery terminal through contact;
a portable portion that is configured to support the battery and to move with respect to the storage portion between a connection position where the storage portion terminal and the battery terminal are connected and a disconnection position where the storage portion terminal and the battery terminal are disconnected; and
a restricting portion that restricts, in a releasable manner, movement of the portable portion from the disconnection position toward the connection position, wherein
the restricting portion includes:
an engagement portion that is provided to the portable portion and
an engaged portion that is positionally fixed relative to the storage portion terminal, and
movement of the portable portion from the disconnection position toward the connection position is restricted by the engagement portion and the engaged portion being engaged with each other at the disconnection position.

2. The battery storage apparatus according to claim 1, wherein
at the disconnection position, the battery terminal of the battery supported by the portable portion is arranged near or adjacent to the storage portion terminal.

3. The battery storage apparatus according to claim 1, further comprising a damping portion that attenuates a moving speed of the portable portion moving from the disconnection position to the connection position.

4. The battery storage apparatus according to claim 1, wherein
the portable portion includes
a portable portion body that supports the battery and
an operating portion that is provided with a grip portion that is configured to be gripped by a worker, and p1
the operating portion is moved relative to the storage portion in an insertion and removal direction through the opening, whereby the portable portion body is moved in the insertion and removal direction between the connection position and the disconnection position.

5. The battery storage apparatus according to claim 4, wherein
the operating portion is configured to move relative to the portable portion body, and
the operating portion includes a disengagement portion that releases the engagement between the engagement between the engagement portion and the engaged portion by moving the operating portion relative to the portable portion body in a disengagement direction different from the insertion and removal direction.

6. The battery storage apparatus according to claim 1, further comprising an opening and closing portion that opens and closes the opening, wherein when the portable portion is at the disconnection position, a portion of the battery supported by the portable portion protrudes to the outside of the storage portion through the opening, thereby restricting the opening and closing portion from covering the opening to be in the closed state, and when the portable portion is at the connection position, the battery is arranged further inward in the storage portion than when the portable portion is at the disconnection position, whereby the opening and closing portion is allowed to enter the closed state.

7. A battery storage apparatus configured to store a battery including a battery terminal, the battery storage apparatus comprising:

a storage portion that includes:

an opening through which the battery is inserted and removed, and a storage space that stores the battery in a manner so that the battery is attached and detached through the opening;

a storage portion terminal that is positionally fixed relative to the storage portion and is configured to connect with the battery terminal through contact;

a portable portion that is configured to support the battery and to move with respect to the storage portion between a connection position where the storage portion terminal and the battery terminal are connected and a disconnection position where the storage portion terminal and the battery terminal are disconnected; and a restricting portion that restricts, in a releasable manner, movement of the portable portion from the disconnection position toward the connection position, wherein the restricting portion includes:

an engagement portion that is provided to the portable portion and an engaged portion that is positionally fixed relative to the storage portion terminal, and movement of the portable portion from the disconnection position toward the connection position is restricted by the engagement portion and the engaged portion being engaged with each other at the disconnection position;

wherein the portable portion includes:

a portable portion body that supports the battery and an operating portion that is provided with a grip portion that is configured to be gripped by a worker, and the operating portion is moved relative to the storage portion in an insertion and removal direction through the opening, whereby the portable portion body is moved in the insertion and removal direction between the connection position and the disconnection position;

wherein the operating portion is configured to move relative to the portable portion body, and the operating portion includes a disengagement portion that dissolves the engagement between the engagement between the engagement portion and the engaged portion by moving the operating portion relative to the portable portion body in a disengagement direction different from the insertion and removal direction;

wherein the portable portion body includes a guide portion that extends in the insertion and removal direction and guides the movement of the operating portion relative to the portable portion body, the grip portion is arranged on a side opposite the storage portion terminal side in the insertion and removal direction of the operating portion, and the operating portion includes an operating portion biasing member that causes the operating portion to be inclined relative to the extension direction of the guide portion and elastically biases the grip portion toward the outside of the opening when viewed in the insertion and removal direction.

8. A battery storage apparatus configured to store a battery including a battery terminal, the battery storage apparatus comprising:

a storage portion that includes:

an opening through which the battery is inserted and removed, and a storage space that stores the battery in a manner so that the battery is attached and detached through the opening;

a storage portion terminal that is positionally fixed relative to the storage portion and is configured to connect with the battery terminal through contact;

a portable portion that is configured to support the battery and to move with respect to the storage portion between a connection position where the storage portion terminal and the battery terminal are connected and a disconnection position where the storage portion terminal and the battery terminal are disconnected; and a restricting portion that restricts, in a releasable manner, movement of the portable portion from the disconnection position toward the connection position, wherein the restricting portion includes:

an engagement portion that is provided to the portable portion and an engaged portion that is positionally fixed relative to the storage portion terminal, and movement of the portable portion from the disconnection position toward the connection position is restricted by the engagement portion and the engaged portion being engaged with each other at the disconnection position;

wherein the portable portion includes:

a portable portion body that supports the battery and an operating portion that is provided with a grip portion that is configured to be gripped by a worker, and the operating portion is moved relative to the storage portion in an insertion and removal direction through the opening, whereby the portable portion body is moved in the insertion and removal direction between the connection position and the disconnection position;

wherein the operating portion is configured to move relative to the portable portion body, and the operating portion includes a disengagement portion that dissolves the engagement between the engagement between the engagement portion and the engaged portion by moving the operating portion relative to the portable portion body in a disengagement direction different from the insertion and removal direction;

wherein the engagement portion is rotatable and switches, by the rotation of the engagement portion, between an engagement of being engaged with the engaged portion and a disengagement state in which the engagement with the engaged portion is dissolved, the engagement portion includes the engagement portion biasing member that elastically biases the engagement portion in a direction to rotate toward the engagement state side, and the operating portion is moved in the disengagement direction, thereby causing the disengagement portion to rotate the engagement portion against the elastic force of the engagement portion biasing member to enter the disengagement state.

* * * * *